Aug. 29, 1933.    J. V. GIESLER    1,925,035
TUBE DRAWING MACHINE
Filed July 1, 1929    19 Sheets-Sheet 1
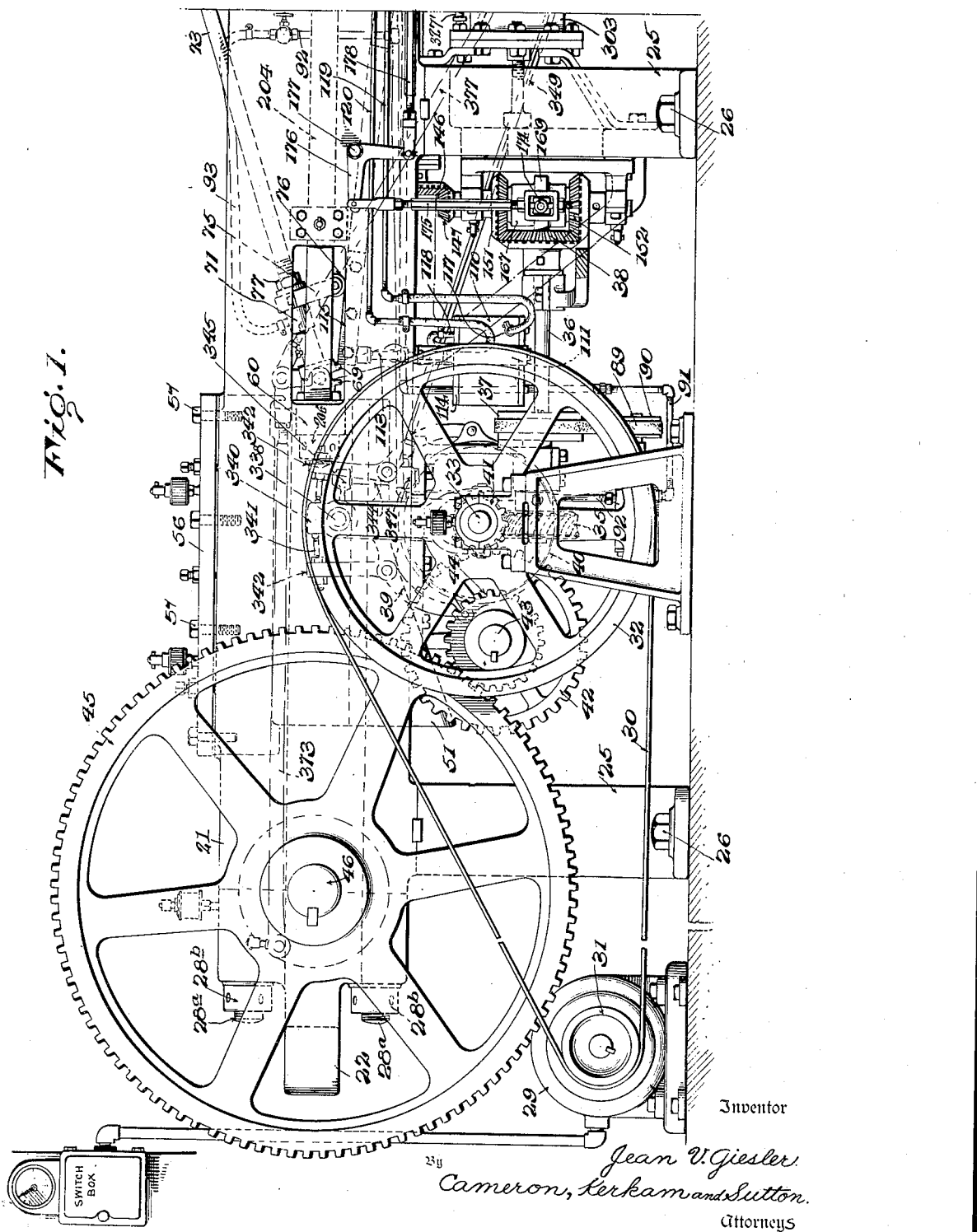

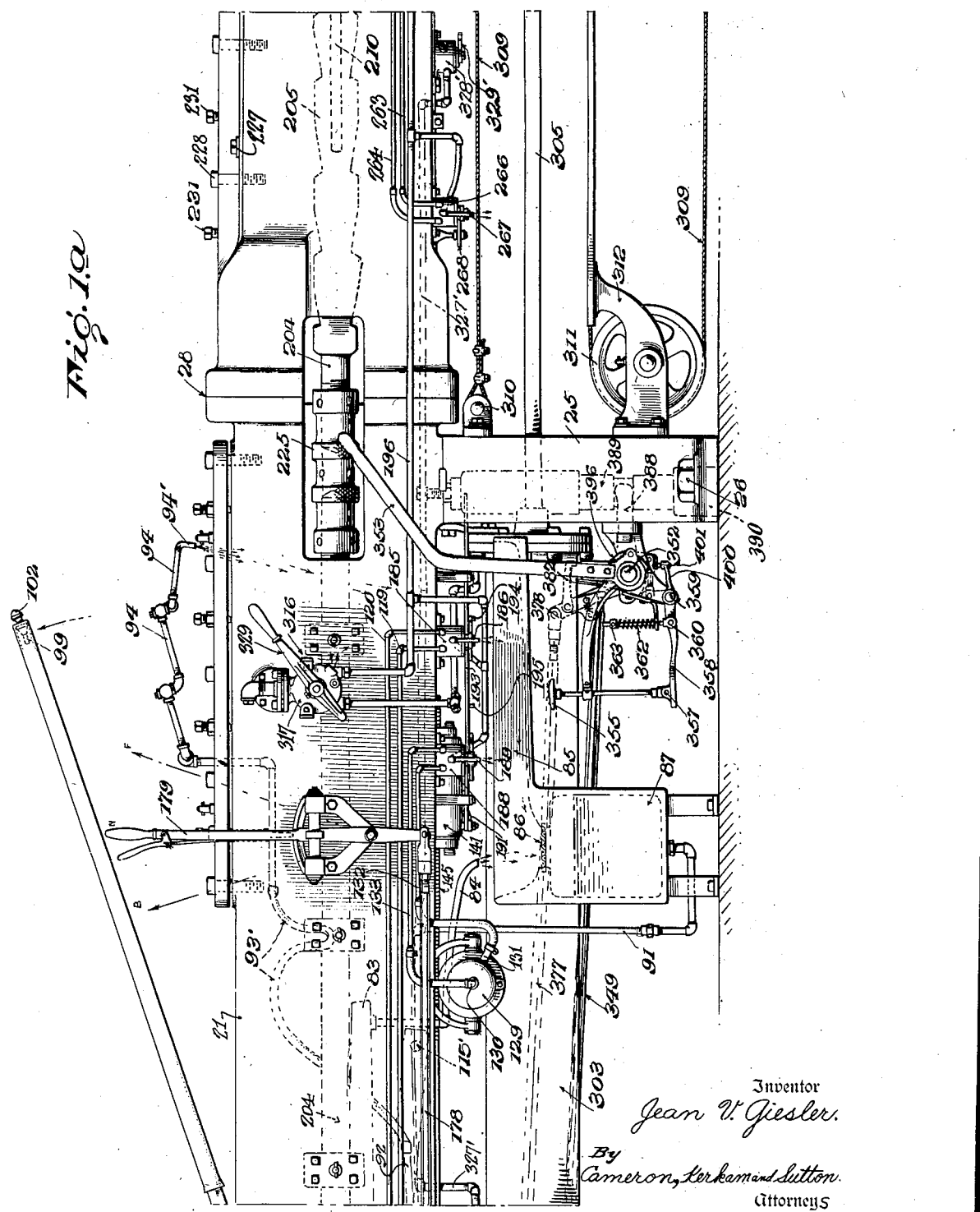

Aug. 29, 1933.    J. V. GIESLER    1,925,035
TUBE DRAWING MACHINE
Filed July 1, 1929    19 Sheets-Sheet 3

Inventor
Jean V. Giesler
By Cameron, Kerkam and Sutton
Attorneys

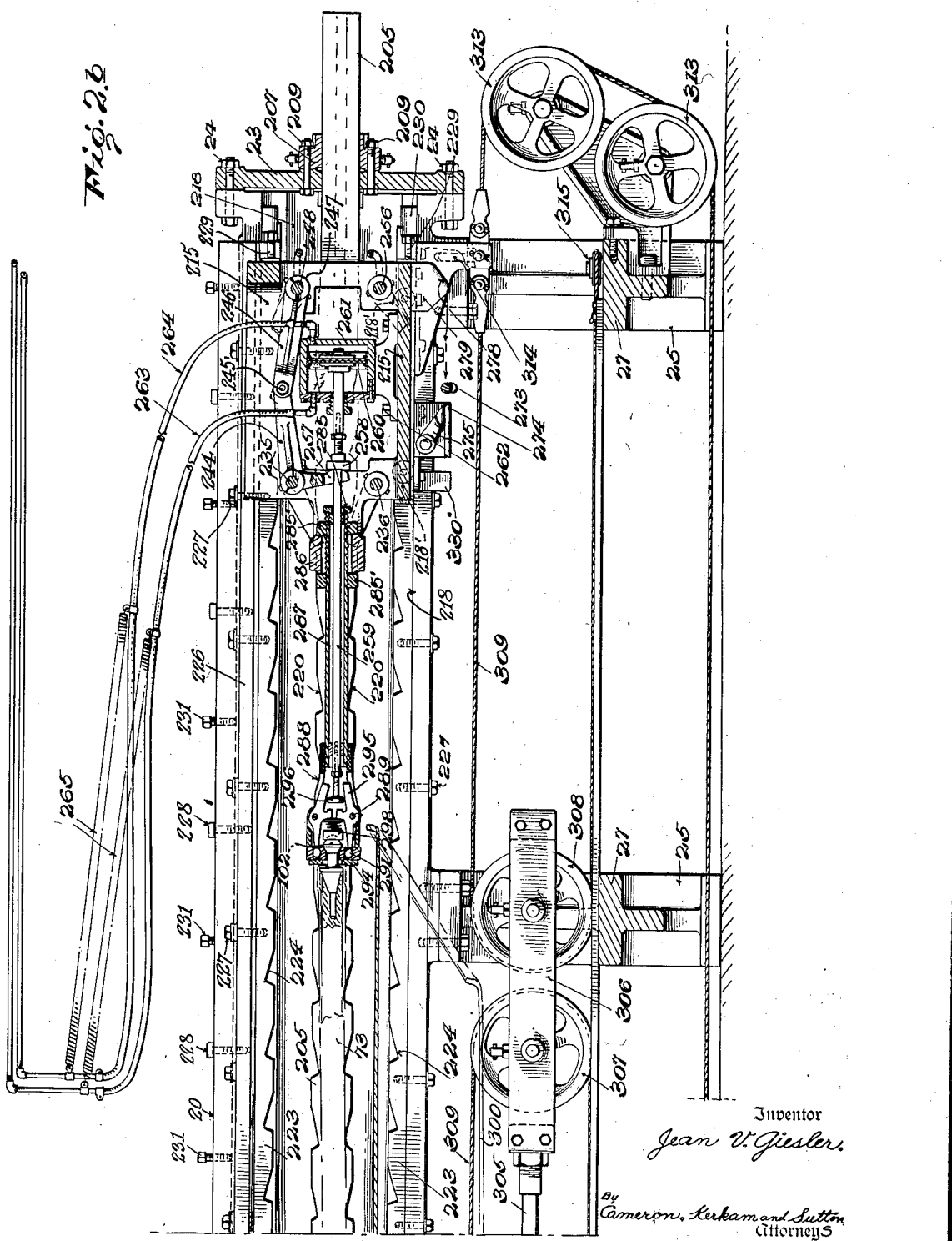

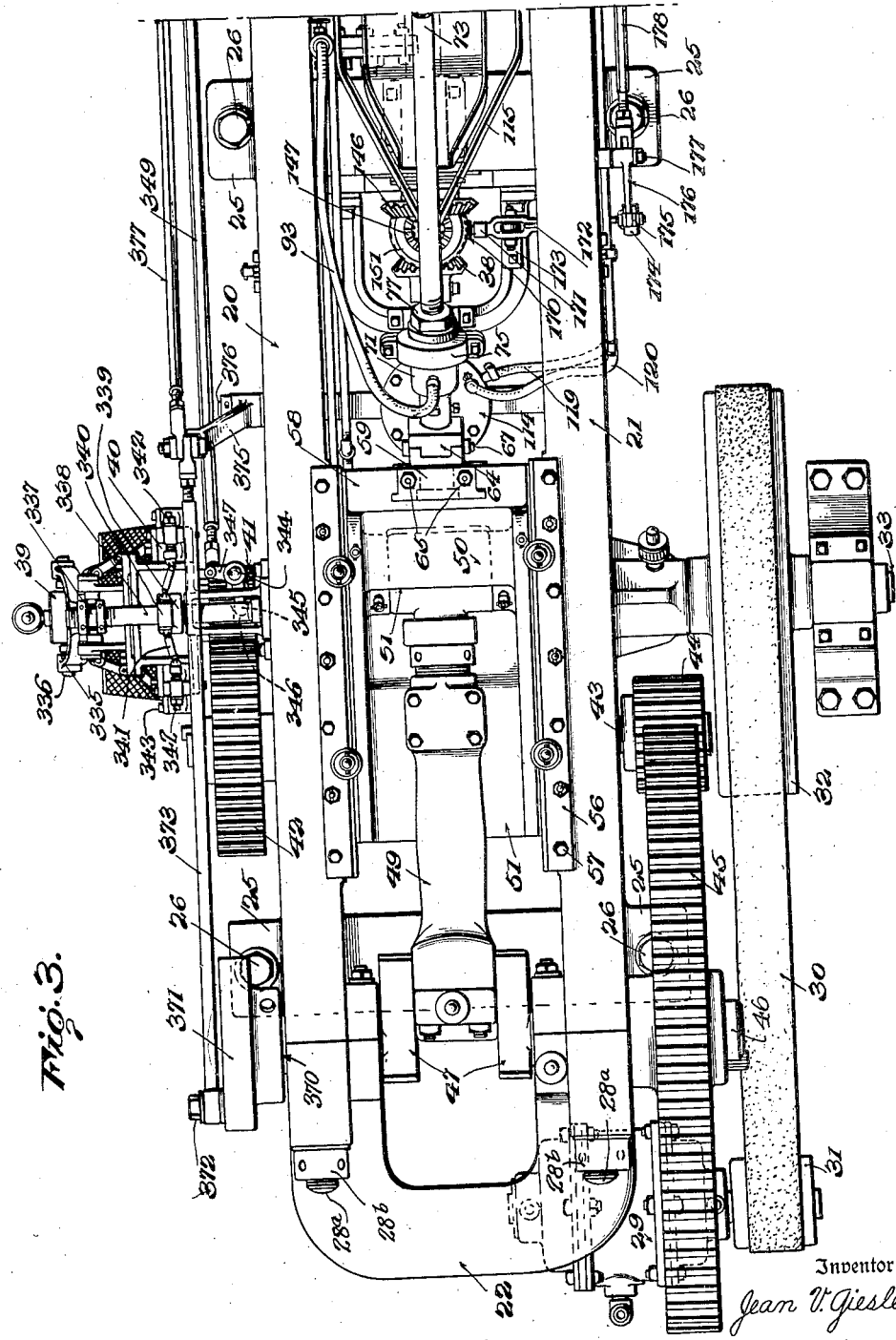

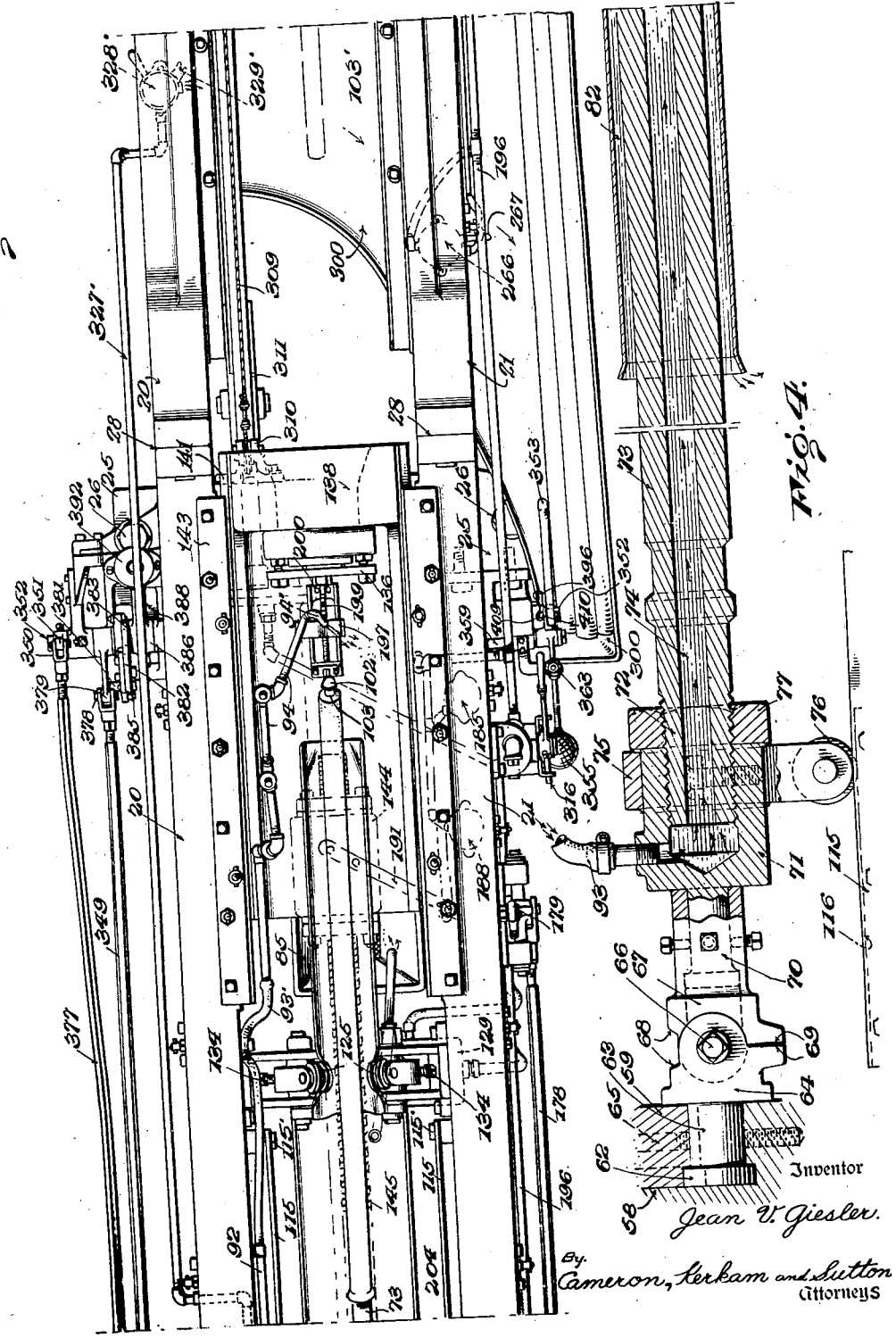

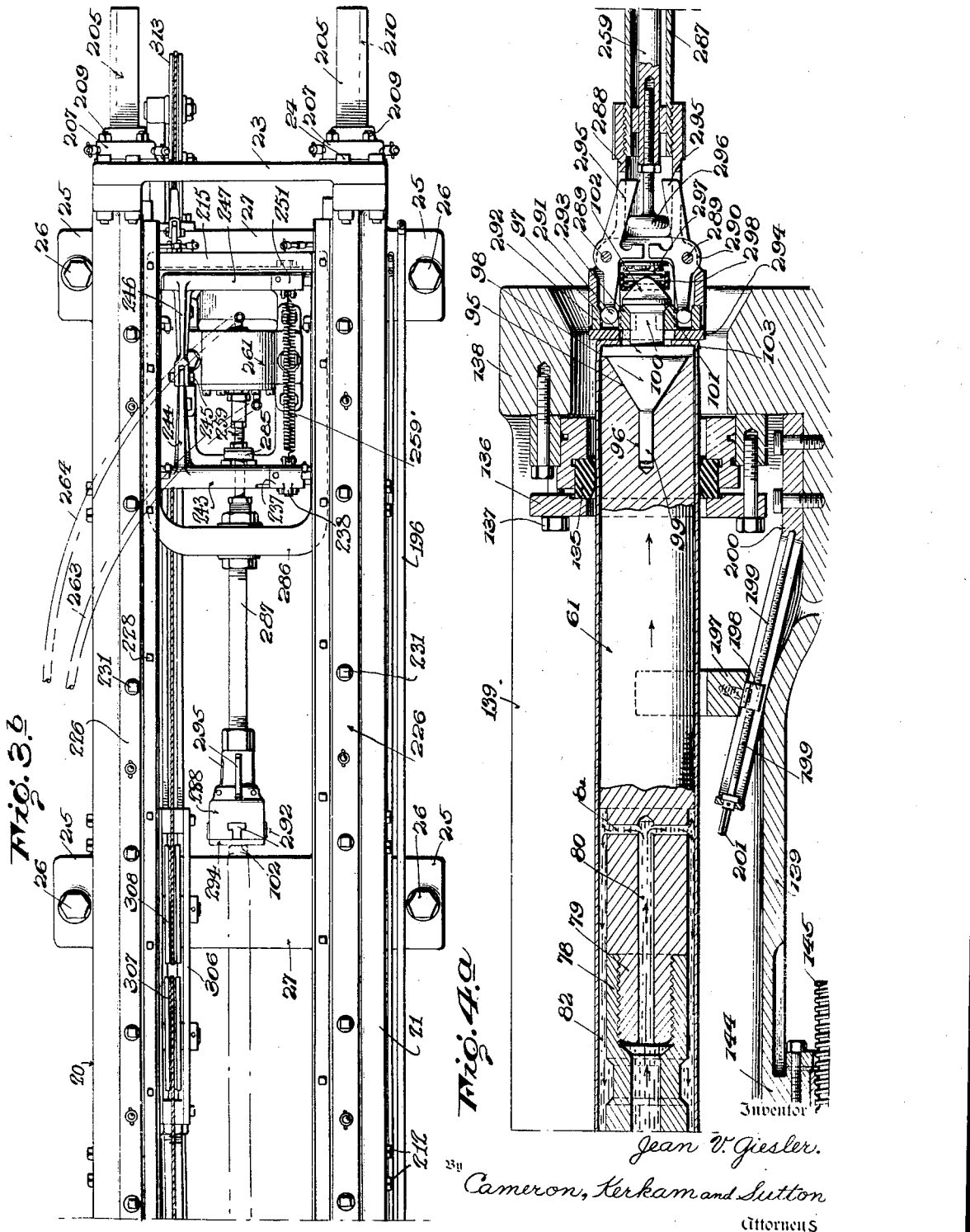

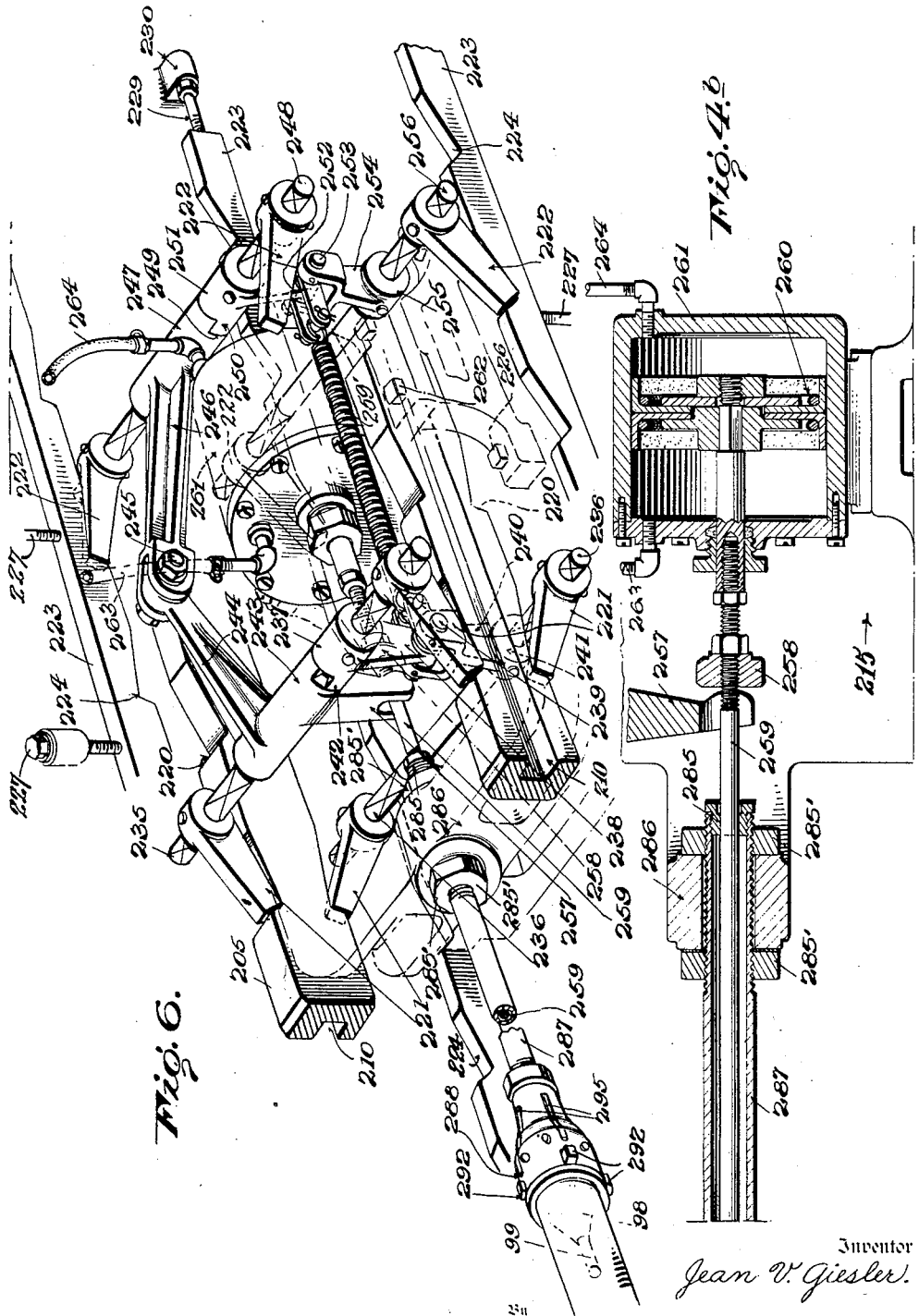

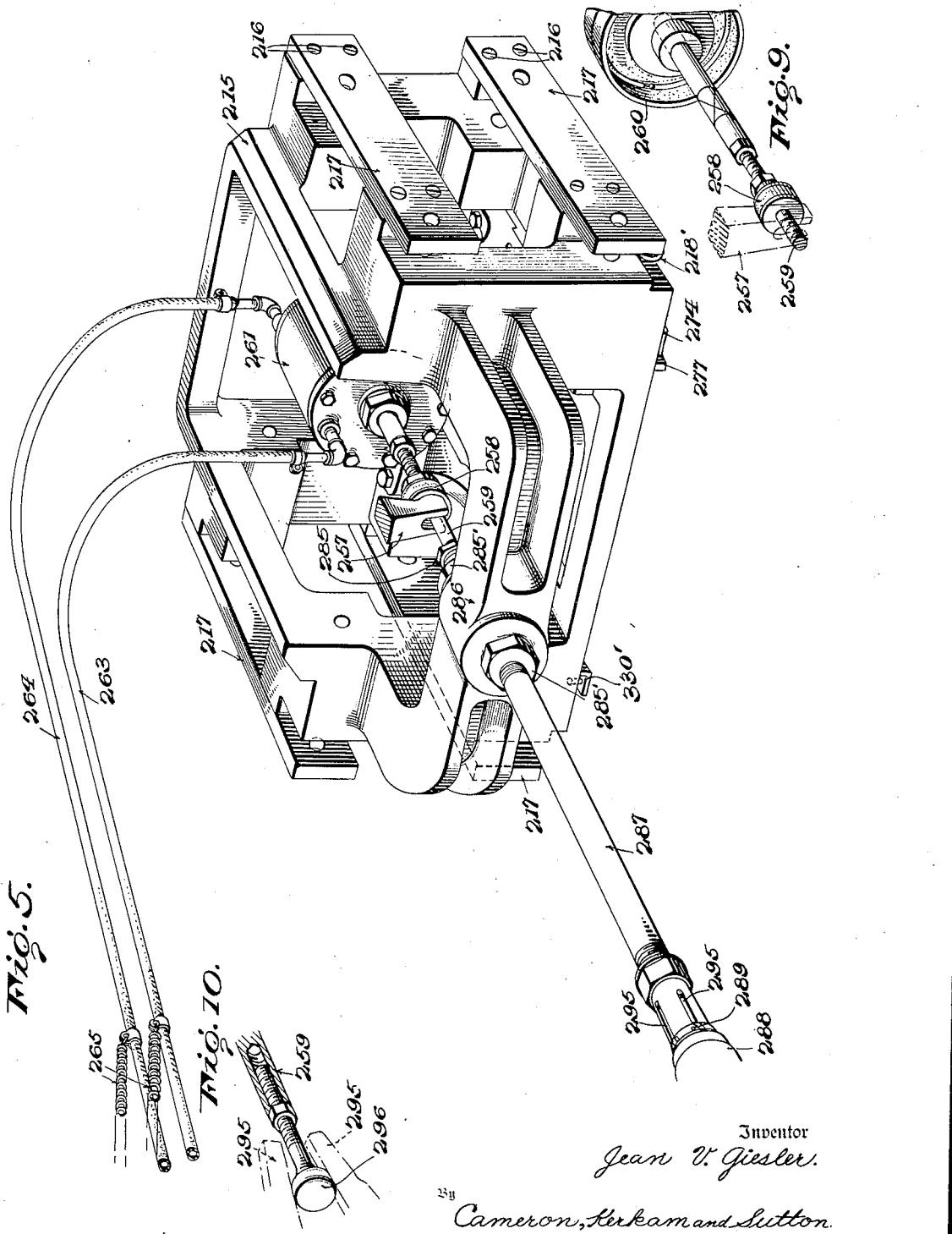

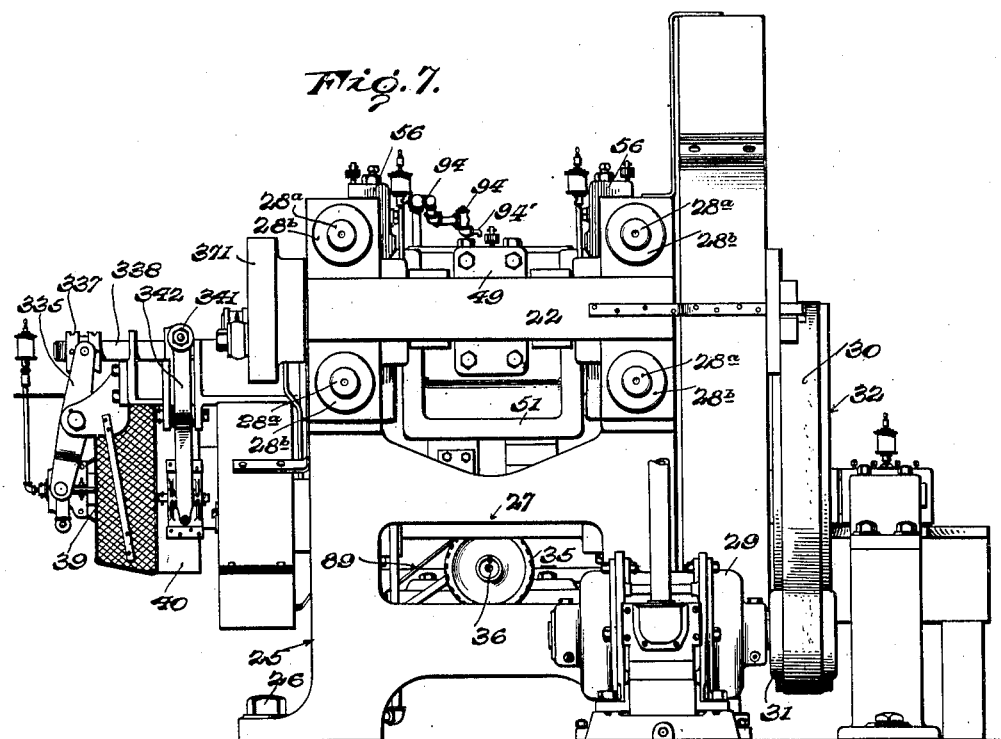
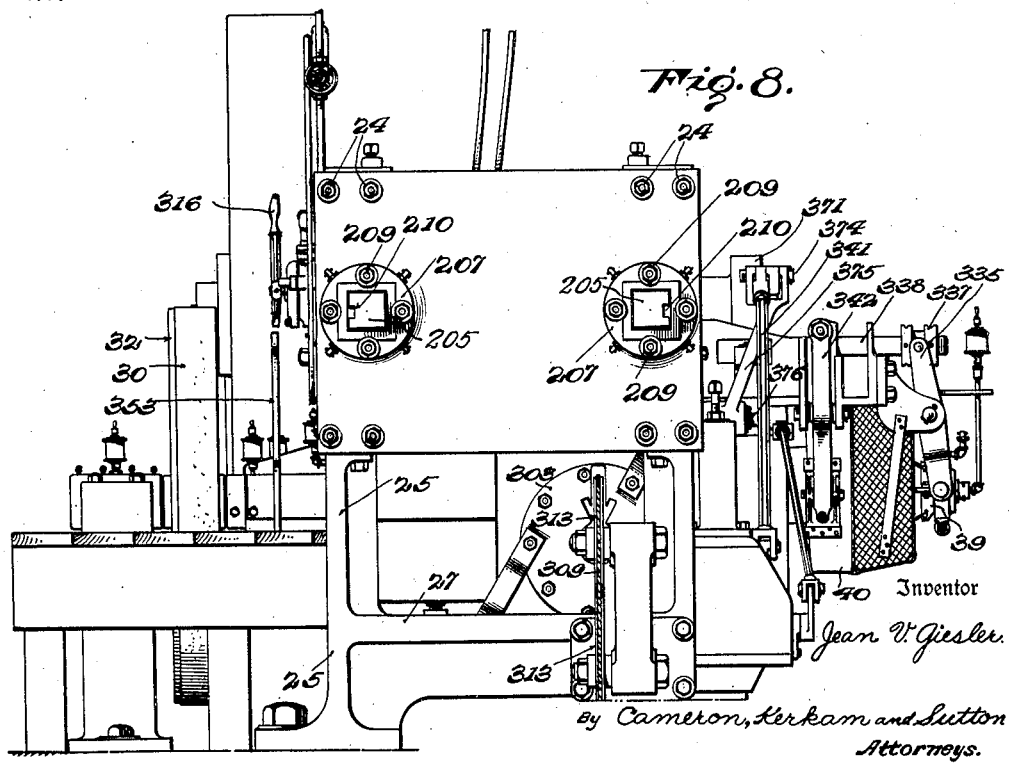

Aug. 29, 1933.  J. V. GIESLER  1,925,035
TUBE DRAWING MACHINE
Filed July 1, 1929   19 Sheets-Sheet 13
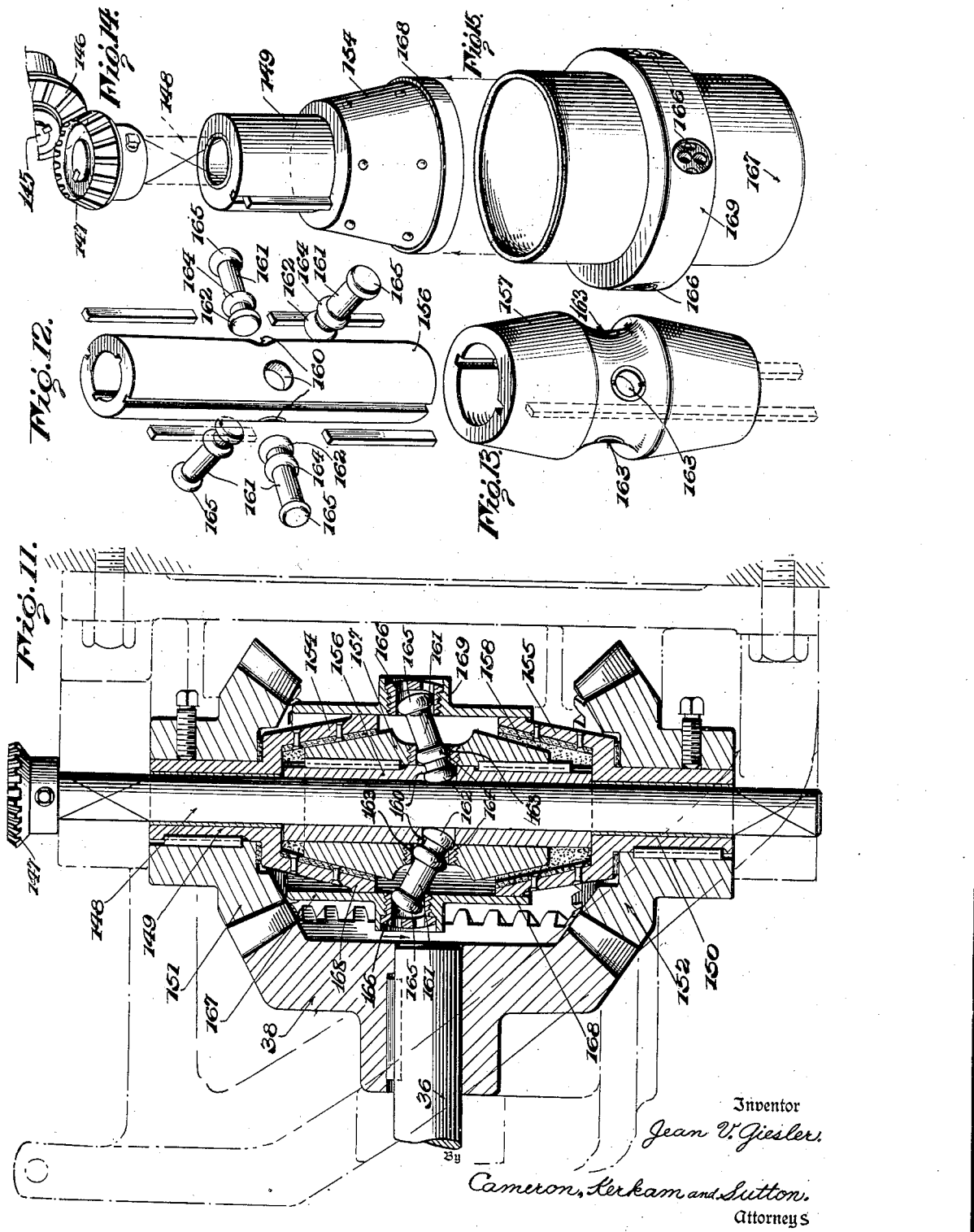
Inventor
Jean V. Giesler
By
Cameron, Kerkam and Sutton.
Attorneys Aug. 29, 1933.  J. V. GIESLER  1,925,035
TUBE DRAWING MACHINE
Filed July 1, 1929   19 Sheets-Sheet 14
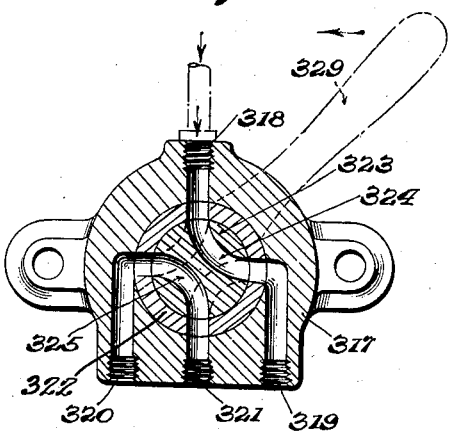
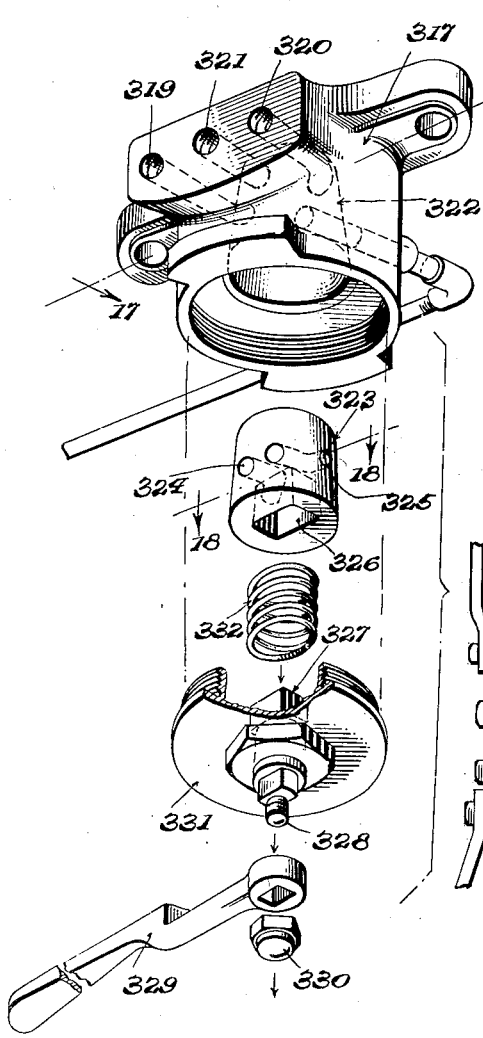
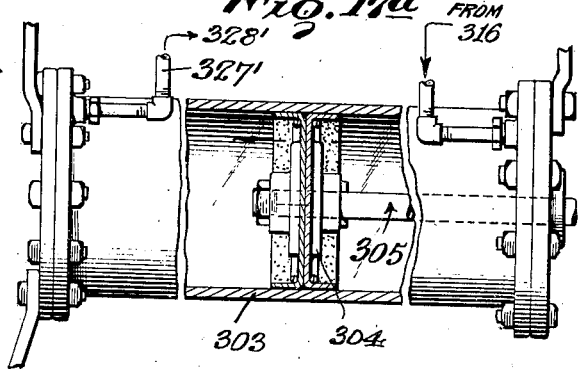
Inventor
Jean V. Giesler.
By
Cameron, Kerkam and Sutton.
Attorneys

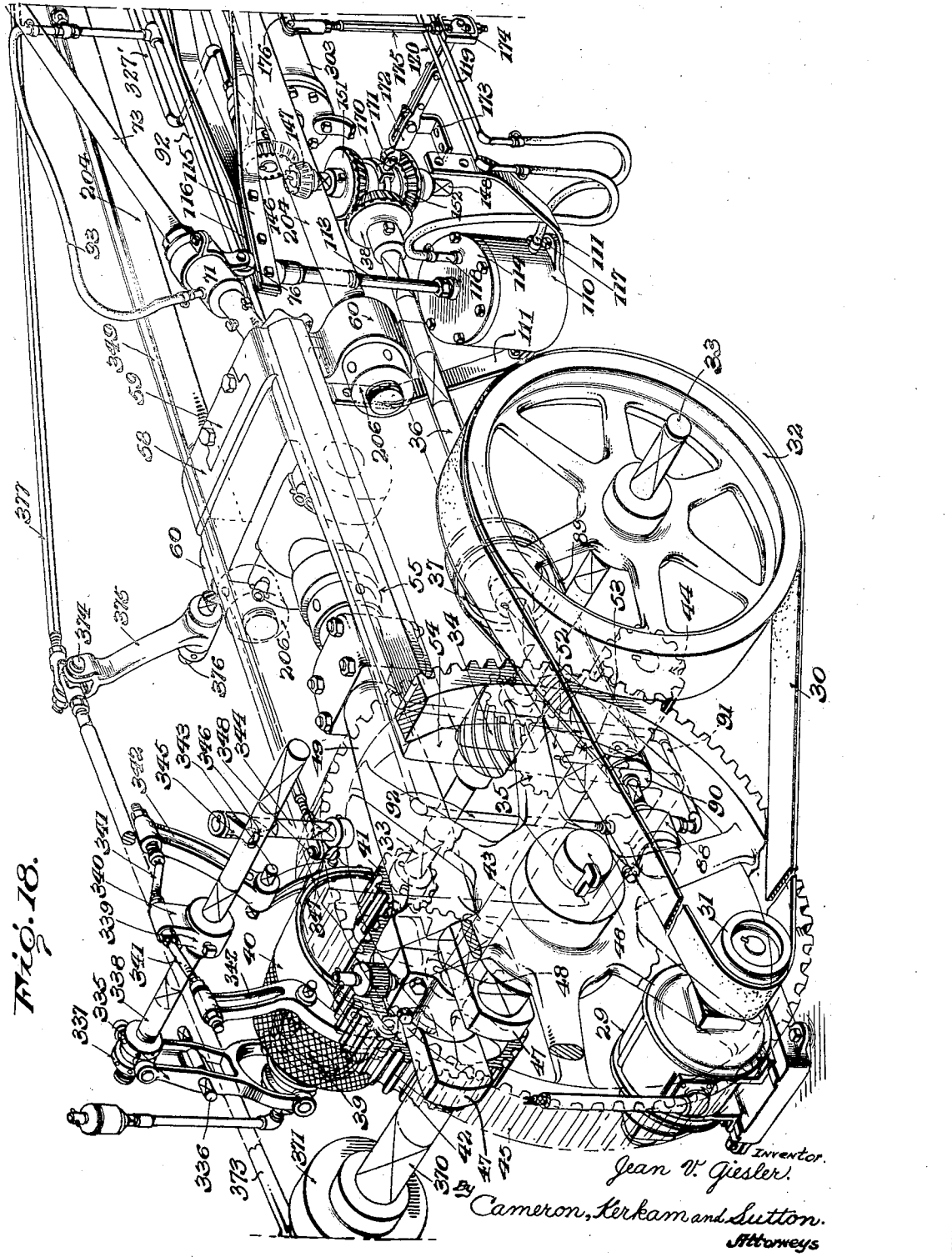

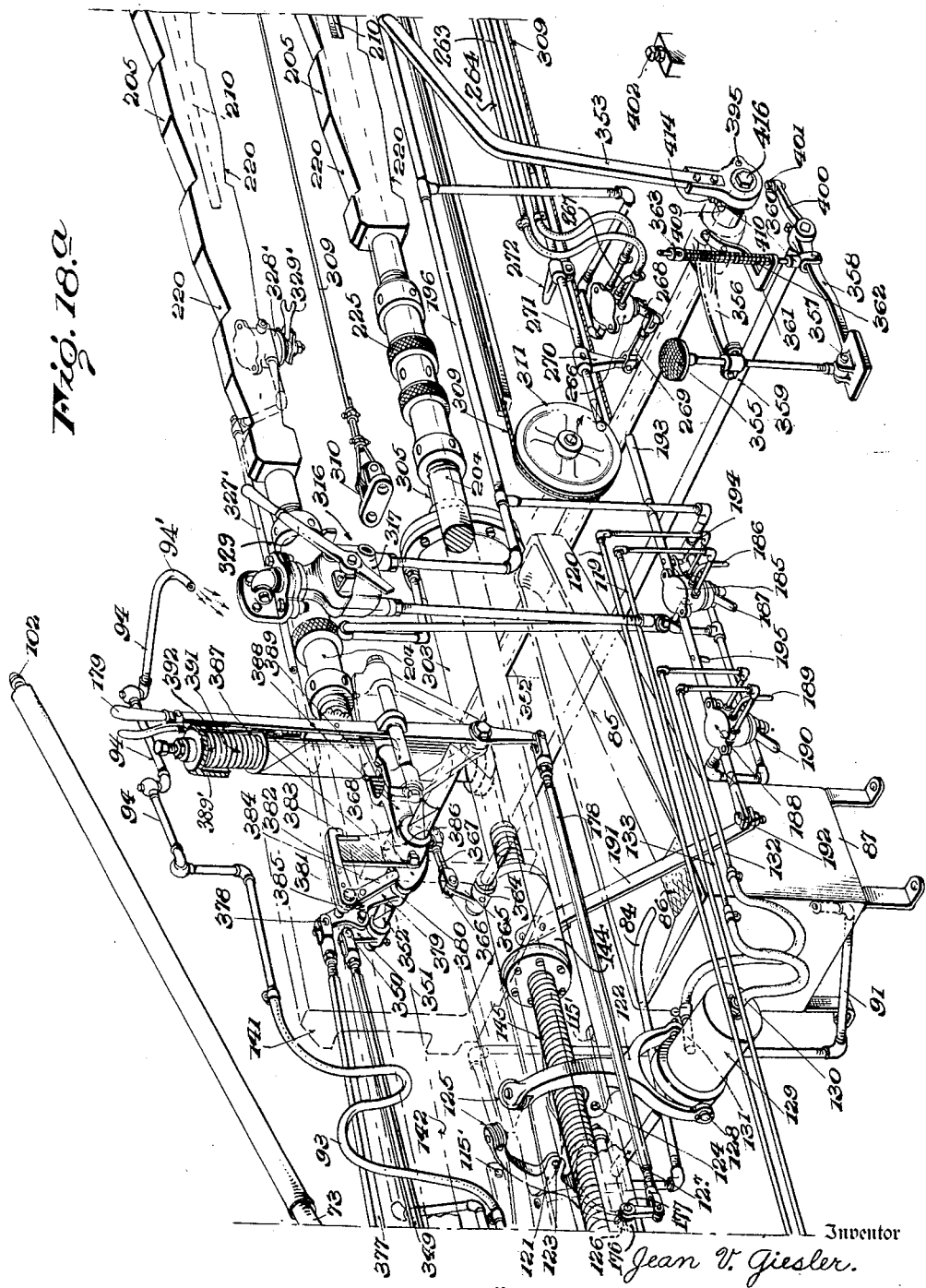

Aug. 29, 1933.  J. V. GIESLER  1,925,035
TUBE DRAWING MACHINE
Filed July 1, 1929  19 Sheets-Sheet 17
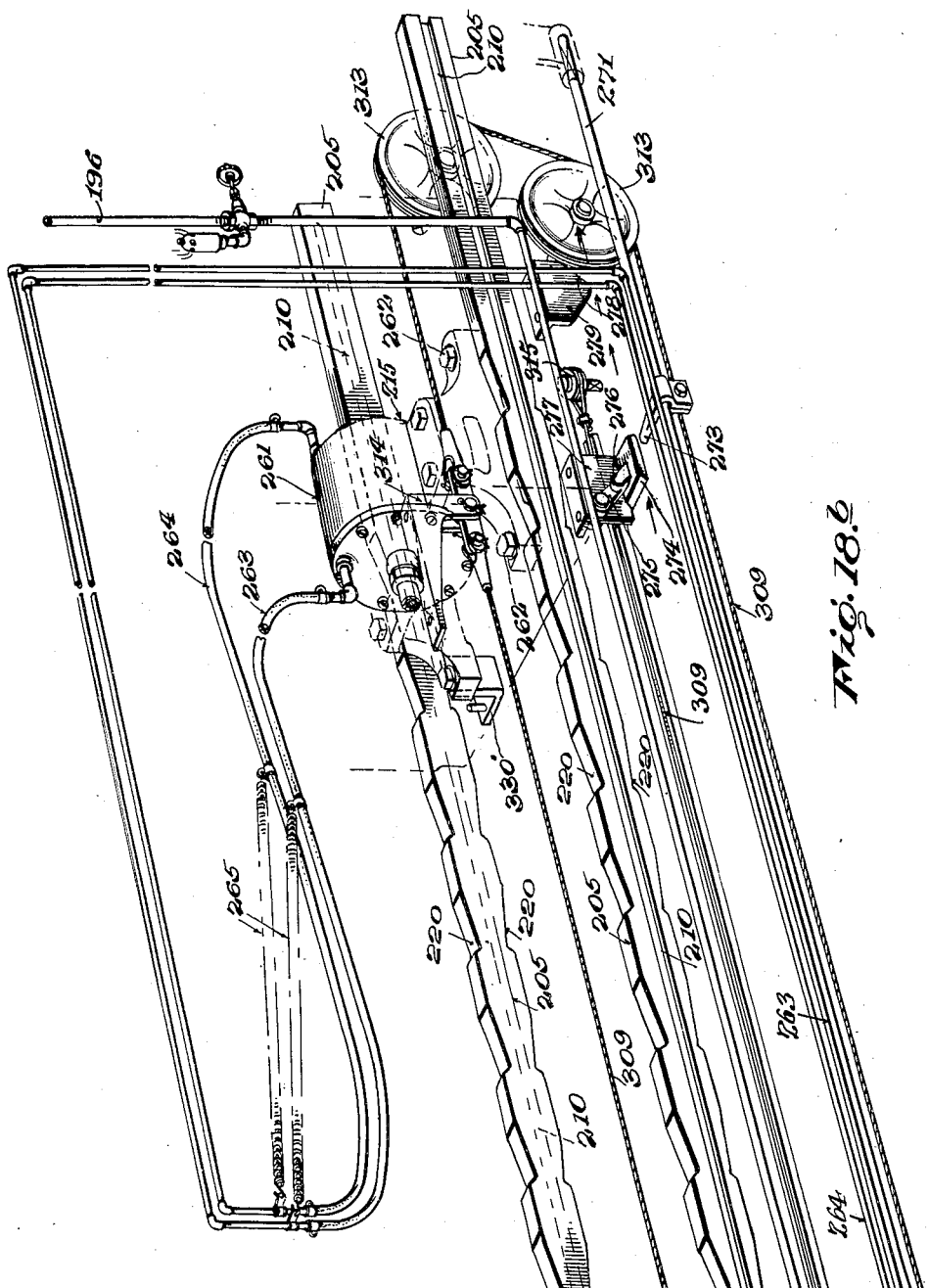
Fig. 18.b
Inventor
Jean V. Giesler
By Cameron, Kerkam and Sutton
Attorneys Aug. 29, 1933.   J. V. GIESLER   1,925,035
TUBE DRAWING MACHINE
Filed July 1, 1929   19 Sheets-Sheet 18

Inventor
Jean V. Giesler
By Cameron, Kerkam & Sutton
Attorneys

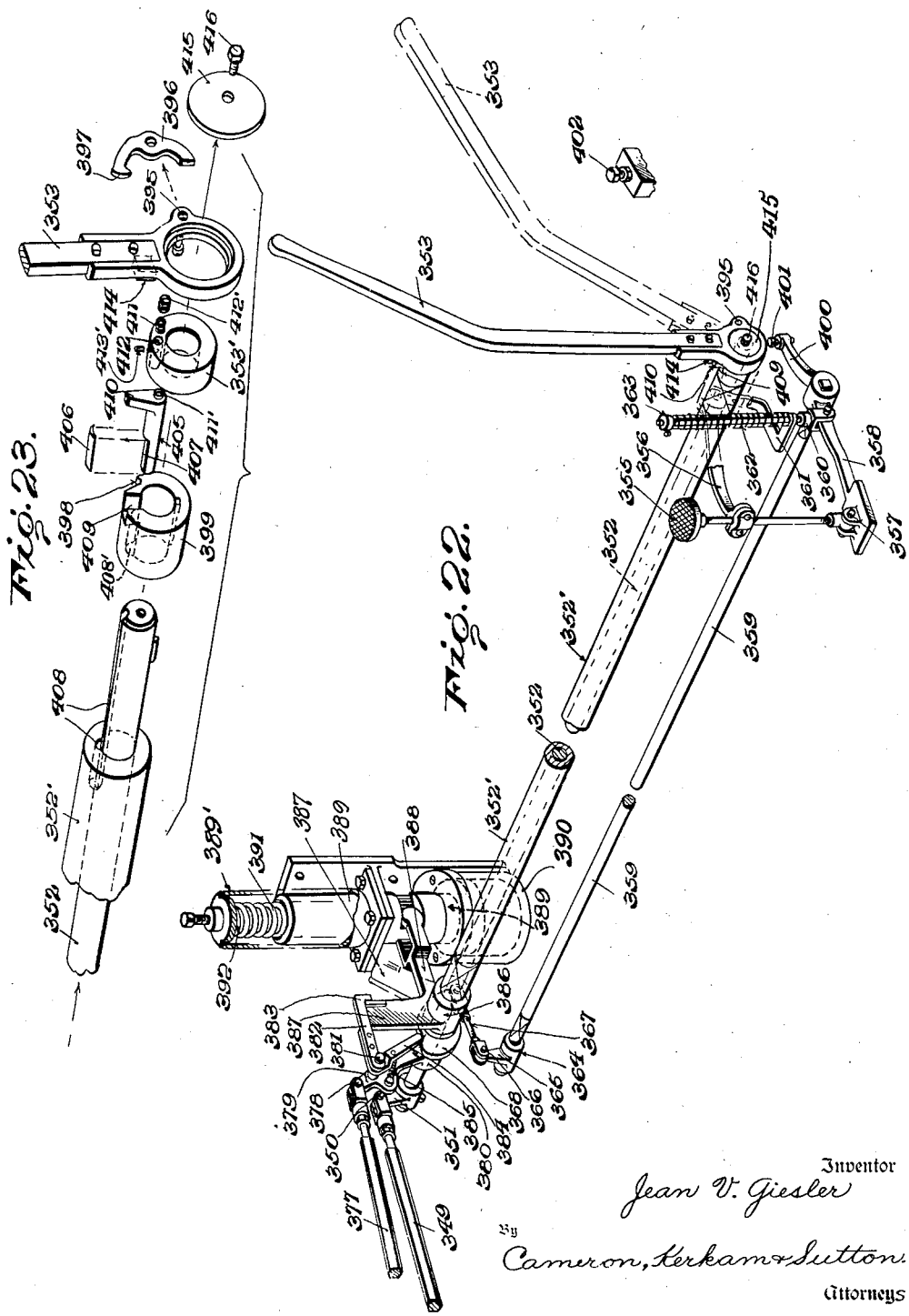

Patented Aug. 29, 1933

1,925,035

UNITED STATES PATENT OFFICE

1,925,035

TUBE DRAWING MACHINE

Jean V. Giesler, Knoxville, Tenn., assignor to The Fulton Sylphon Company, Knoxville, Tenn., a corporation of Delaware Application July 1, 1929. Serial No. 375,161

66 Claims. (Cl. 205—7)

This invention relates to mechanism for drawing tubes, and particularly to mechanism for drawing relatively-long, relatively-thin walled tubes in accordance with the process diclosed and claimed in the patent of Weston M. Fulton, No. 1,654,585, granted January 3, 1928, and entitled Method and apparatus for drawing tubes.

It is an object of this invention to provide a machine for drawing tubes in accordance with the aforesaid process, which is automatic in character, which is simple in operation so as to reduce the number of operatives needed to attend the machine, and which is highly efficient in operation.

Another object of this invention is to provide a machine of the type characterized which is so constructed that there is no unbalanced moment of force, acting on the drawing mechanism, with respect to the horizontal plane of the axis of the tube being drawn.

Another object of the invention is to provide a machine of the type characterized with simple means whereby the tail block may be easily and quickly attached to the end of the tube.

Another object of the invention is to provide a machine of the type characterized with means whereby the tail block may be moved quickly into position for attachment to the end of the tube without danger of destructive impacts or shocks to the machine.

Another object of the invention is to provide a machine of the type characterized with means whereby the tail block may be automatically detached from the tube at the end of the drawing portion, and whereby, if desired, the finished tube may be ejected from the machine.

Another object of the invention is to provide a machine of the type characterized with means for operating the tail block which is symmetrically disposed with respect to the axis of the tube, so that there are no unbalanced moments of force with respect to the horizontal plane of the axis of the tube being drawn.

Another object of the invention is to provide a machine of the type characterized with improved means for moving the die block into and out of operative position.

Another object of the invention is to provide a machine of the type characterized with improved means for guiding the punch.

Another object of the invention is to provide a machine of the type characterized with improved means for moving the punch into and out of operative relationship with the die.

Another object of the invention is to provide a machine of the type characterized with improved controls whereby a single operative at a single position at the machine may control all of the operations of the machine through relatively few and relatively simple movements.

Another object of the invention is to provide a machine of the type characterized with controlling means whereby the drawing operation may be initiated only at the proper instant in the cycle of the operation of the machine.

Another object of the invention is to provide a machine of the type characterized which is composed of a minimum number of relatively strong rugged elements, and which may be safely operated at a relatively high speed.

Other objects will appear as the description of the invention proceeds.

The invention is capable of receiving a variety of mechanical expressions, one of which is shown on the accompanying drawings, but it is to be expressly understood that the drawings are for purposes of illustration only, and are not to be construed as the definition of the limits of the invention, reference being had to the appended claims for that purpose.

Referring in detail to the drawings, wherein the same reference characters are employed to designate corresponding parts in the several figures:—

Figs. 1, 1ª, and 1ᵇ, together constitute an elevation of the machine, Fig. 1 being an elevation of the power end of the machine, Fig. 1ª being an elevation of the intermediate portion of the machine, and Fig. 1ᵇ being an elevation of the tail end of the machine;

Figs. 2, 2ª, and 2ᵇ are axial sections through the machine, Fig. 2 being an axial section through the power end of the machine, Fig. 2ª being an axial section through the intermediate portion of the machine and showing the punch in elevated inoperative position, and Fig. 2ᵇ being an axial section through the tail end of the machine showing the position of the parts at the end of the drawing operation;

Figs. 3, 3ª, and 3ᵇ are plan views of the machine, Fig. 3 being a plan of the power end of the machine, Fig. 3ª being a plan view of the intermediate portion of the machine, and Fig. 3ᵇ being a plan view of the tail end of the machine, the parts being shown in the same relative positions as in Figs. 2, 2ª, and 2ᵇ;

Figs. 4, 4ª, and 4ᵇ are sectional views through the punch, chuck and chuck-operating means, Fig. 4 being a sectional view through the rearward end of the punch, Fig. 4ª being a sectional view through the forward end of the punch and the chuck, and Fig. 4b being a sectional view through the chuck-operating mechanism;

Fig. 5 is a perspective view of the tail block;

Fig. 6 is a perspective view showing the operating devices within the tailblock;

Fig. 7 is an end view of the power end of the machine;

Fig. 8 is an end view of the tail end of the machine;

Fig. 9 is a perspective view of a detail of the mechanism for operating the pawls;

Fig. 10 is a perspective view of a detail of the mechanism for operating the chuck jaws;

Fig. 11 is an axial section through the double throw friction clutch;

Figs. 12, 13, 14 and 15 are detail views of the component elements of the double throw clutch;

Fig. 16 is a perspective view of the component parts of the control valve;

Fig. 17 is a vertical section through the control valve and the piston operated thereby;

Fig. 17a is a detail of the means for returning the tail block;

Figure 20:
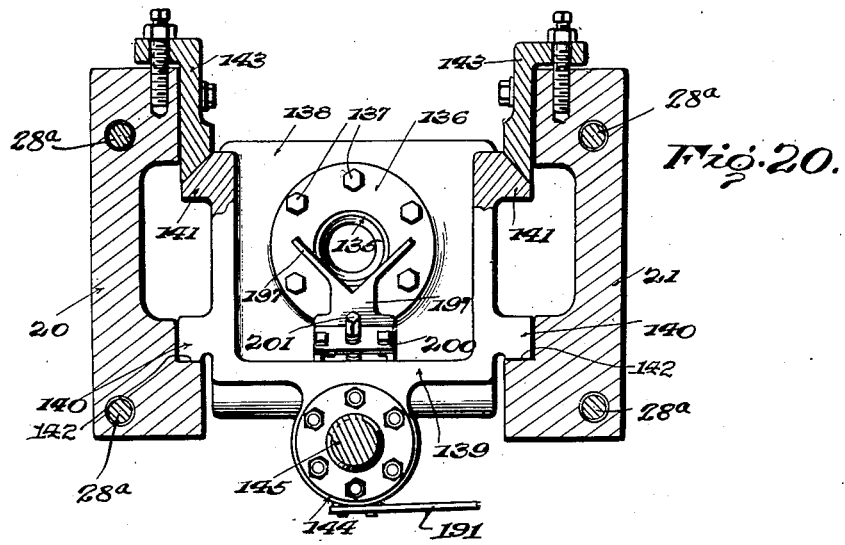
Figures 19, 21:
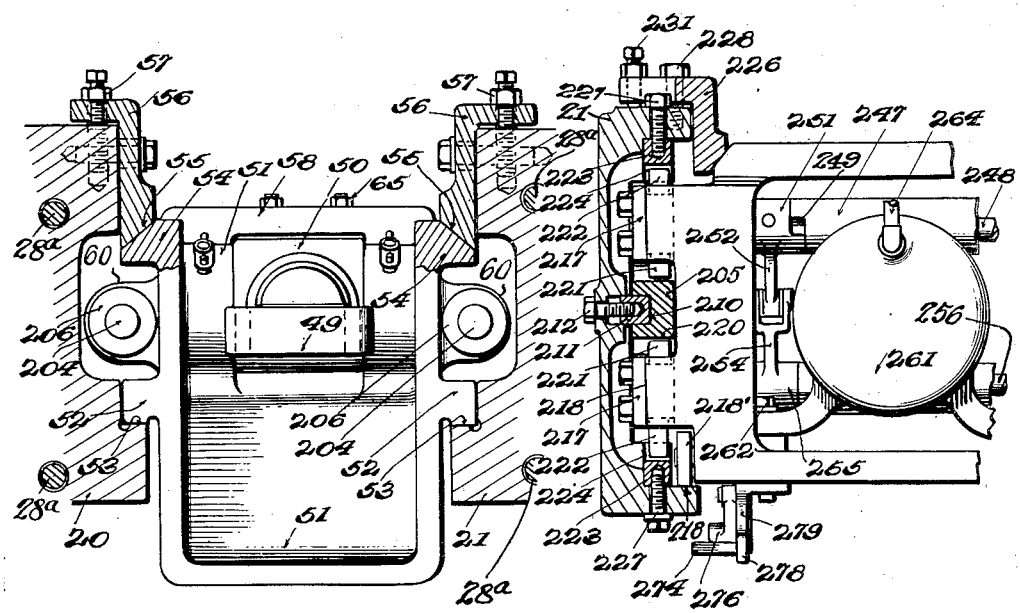

Figs. 18, 18a and 18b are perspective views of a major part of the operating and controlling elements of the machine, some parts being omitted for the sake of clearness, Fig. 18 being a perspective view of elements at the power end of the machine, Fig. 18a being a perspective view of elements at the intermediate portion of the machine, and Fig. 18b being a perspective view of elements at the tail end of the machine;

Figs. 19 and 20 are fragmentary sections through the side frames to illustrate how the ram and die block are supported and guided;

Fig. 21 is a fragmentary section through side frames to illustrate how the tail block is supported and guided;

Fig. 22 is a perspective view of the mechanism for operating the clutch and brakes; and Fig. 23 is a view in perspective of component elements of the mechanism shown in Fig. 22.

Figure 2:
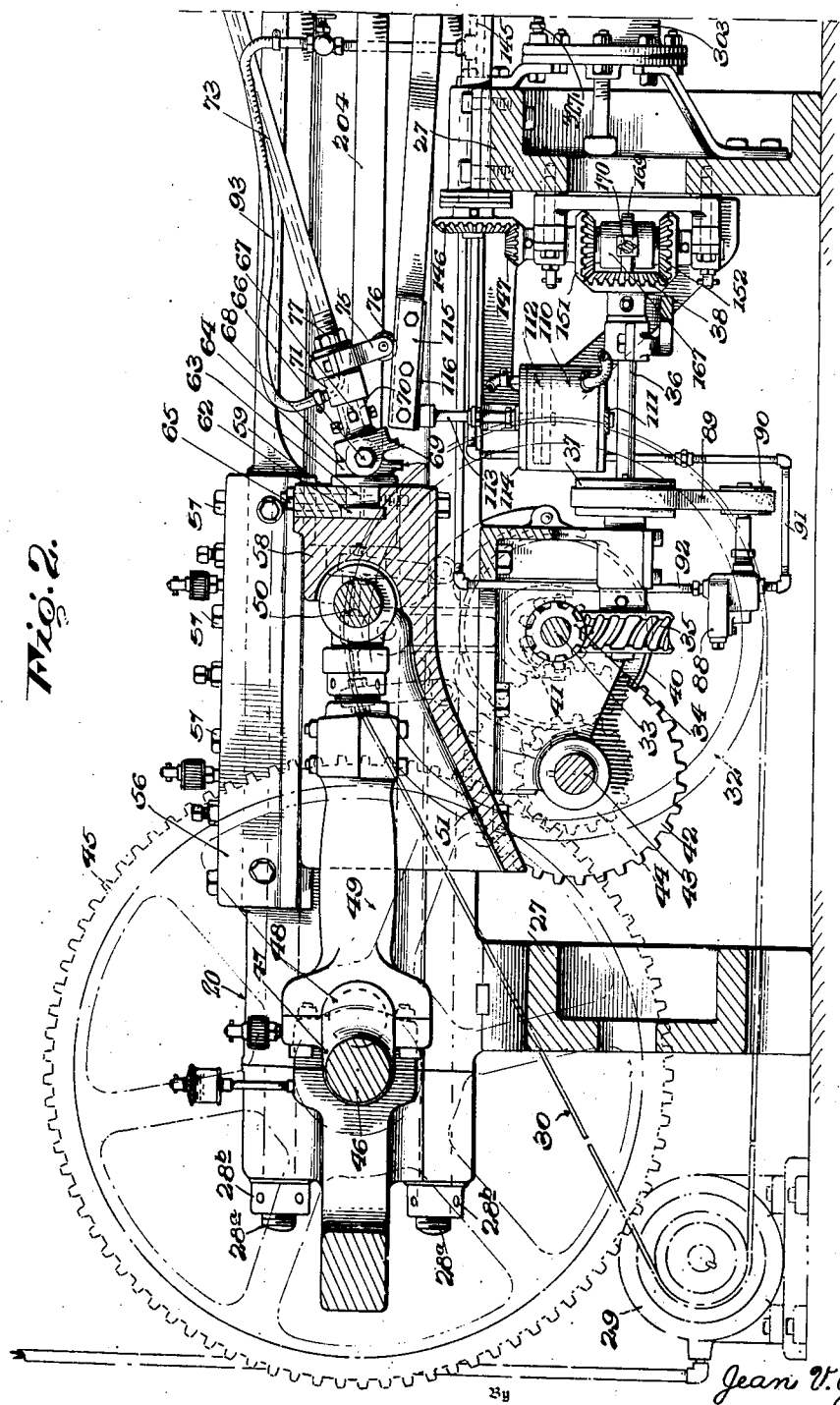

In the form shown, the operating parts of the machine are mounted upon a relatively long heavy frame which in plan is of generally rectangular configuration (Figs. 1, 1a, 1b, 3, 3a and 3b), and composed of longitudinally extending side members 20 and 21, which also form ways for the rectilinearly movable elements hereinafter described, and end members 22 and 23, the latter being shown as detachable and secured in position in any suitable way, as by bolts 24. The aforesaid rectangular frame is suitably supported at spaced points along its length, and at either side thereof, by upright members 25, shown as suitably secured to a foundation, as by bolts 26, said frame being preferably strengthened and braced by transverse members 27 connecting opposed upright members 25. If desired the frame may be made in two or more sections for convenience in transportation and assembly. As shown the frame is longitudinally divided at 28 (Fig. 1a) and the tail section of the frame is rigidly connected to the head section of the frame by through bolts 28a and lock nuts 28b (Figs. 1 and 2).

The machine may be driven from any suitable source of power, as line shafting, but is shown as driven by an electric motor 29 (Fig. 1), and a belt drive 30 leading from a pulley 31 on said motor to a pulley 32 on the main driving shaft 33 of the machine. Said driving shaft 33 extends transversely of the machine (Fig. 18) and carries intermediate its length a worm 34 which meshes with a worm wheel 35 on a longitudinally extending shaft 36, said shaft carrying intermediate its length a belt pulley 37 for driving the pump hereinafter described. Shaft 36 also carries at its forward end a beveled pinion 38 for driving the mechanism which moves the die block, to be hereinafter described. The opposite end of the main driving shaft 33 is provided with a clutch 39, of any suitable construction, with which is associated a brake drum 40, whereby said shaft 33 may drive, through said clutch, a pinion 41 loosely mounted on said shaft 33 and meshing with a pinion 42 carried by a jack shaft 43. Shaft 43 also carries a pinion 44 meshing with a relatively large driving pinion 45 on the crank shaft 46. The crank 47 (Figs. 2 and 3), which may be of any suitable construction, is connected through its crank pin 48 to a rod 49 pivotally connected at 50 to a ram 51. Said ram is channel shaped in cross section, and each side thereof is provided with a horizontally extending rib 52 (Fig. 19) which rests on a ledge 53 projecting inwardly from a longitudinal side member of the frame, said ledges forming ways on which said ram may reciprocate, and the lateral faces of said ribs 52 engaging the inner faces of said longitudinal frame members to guide said ram and prevent lateral play. Adjacent their upper edges the side of said ram are provided with outwardly extending ribs 54 having beveled faces 55, which cooperate with beveled faced retaining blocks 56 suitably secured to the longitudinal frame members, as by bolts 57. At its forward end, said ram 51 is closed by a head 58 (Fig. 2), which is recessed to receive a retaining block 59, for a purpose to be explained. Projecting from either side of the head of the ram is a heavy apertured lug 60 (Fig. 18) to which are attached the feed rack bars to be described.

Suitably connected to the head 58 of the ram is a punch 61 of any suitable size and construction. In the form shown, the head 58 of the ram has a T-shaped recess (Figs. 2 and 4) so that the head 62 and shank 63 of the punch-rod retaining-block 64 may be mounted in said head by sliding the same downwardly into position in said slot, after which the retaining block 59, T-shaped in cross section, may be slid into position and suitably retained therein, as by bolts 65. Block 64 carries a pivot 66 on which is mounted the connector 67 for the punch-rod, said block 64 and connector 67 having beveled faces 68 designed to contact and limit the upward movement of the punch, and stop lugs 69 designed to contact and limit the downward movement of the punch. Connector 67 has attached thereto in any suitable way, as by a T head connection 70 and set screws (Fig. 4), a coupling 71 which forms an inlet connection for a lubricating medium of any suitable character, such as a soap solution. The interior of said coupling 71 is threaded to receive the threaded end 72 of the punch rod 73, said punch rod being provided with a passage 74, which extends axially throughout the length thereof and communicates with a chamber in the coupling 71 into which the lubricating medium is delivered. The coupling 71 also carries a strap 75 on which is mounted a roller 76 for a purpose to be explained. The punch rod may be locked in the coupling 71 by a nut 77, if desired.

The forward end of the punch rod 73 is provided with a threaded socket 78 (Fig. 4a) which receives the threaded shank 79 of the punch 61. The rear end of the punch is provided with a passage 80 which communicates with the passage 74 and which terminates in transverse passages 81 leading to the surface of the punch. The forward or operating end of the punch 61 is made of the diameter suitable for engaging operatively with the interior of the tube to be drawn to effect the drawing operation, this portion of the punch extending rearwardly from its forward end for at least that part of the punch which is to cooperate with the die to be described. Rearwardly of this portion, however, and where the transverse passages 81 extend to the surface thereof, the punch is reduced in diameter to approximately the diameter of the punch-rod, so as to leave a clearance 82 between the tube and the punch and punch-rod, to the end that the lubricating fluid which flows through the passages 74, 80 and 81 may flow outwardly between the tube and the punch and punch-rod, wetting the inner surface of the tube which has not yet been engaged by the operating end of the punch, and lubricating the same to reduce the frictional opposition to movement of the punch into cooperative engagement with the succeeding lengths of the tube to be acted upon. The lubricant flows from the open end of the tube as indicated by the arrows in Fig. 4 and is collected in a pan 83 (Fig. 1a) from which it flows through a pipe 84 to a sump tank 85, and thence through strainer 86 to the storage tank 87.

Figure 2A:
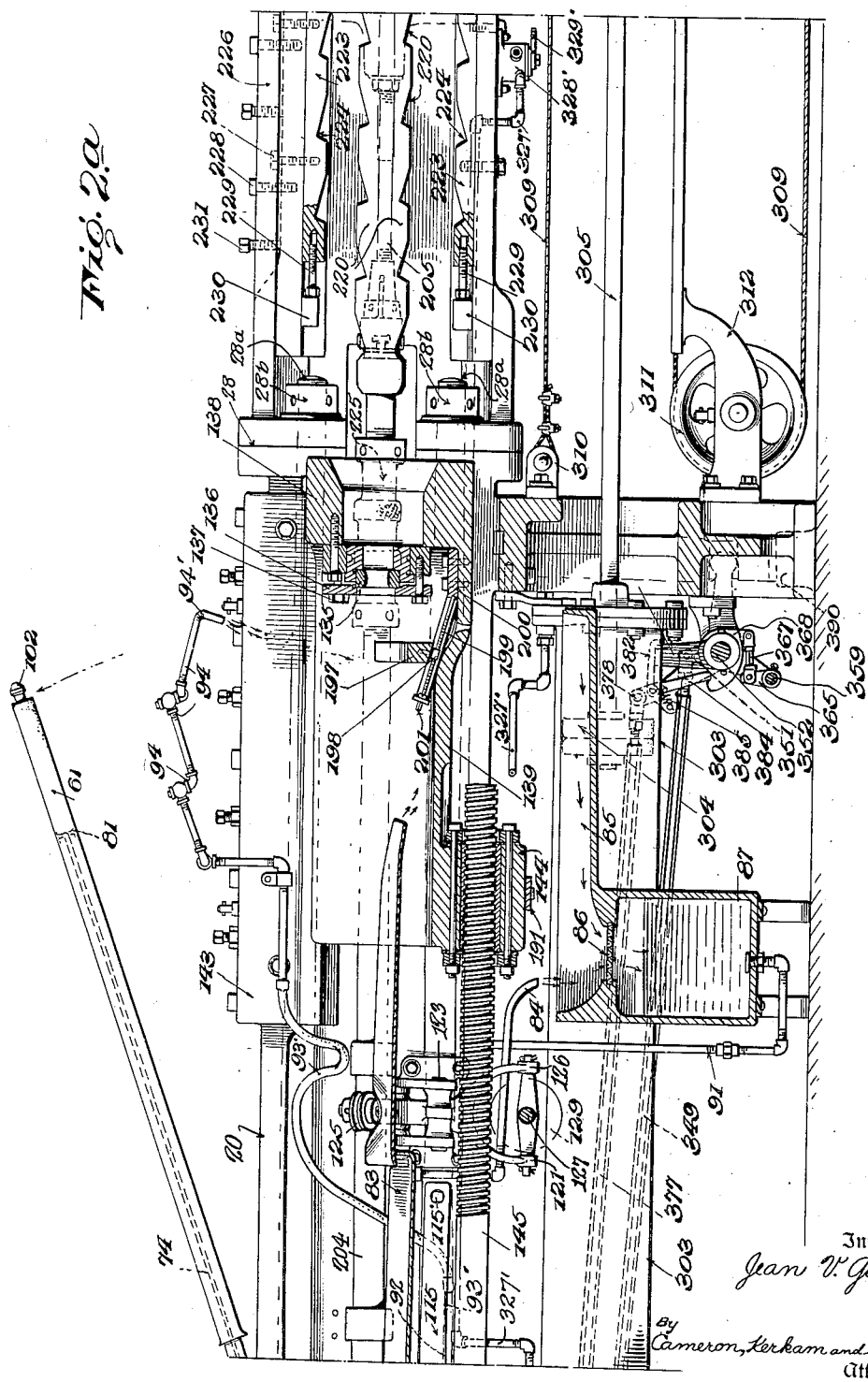

To supply the lubricant to the coupling 71 heretofore described, a pump 88 (Figs. 2 and 18) is suitably mounted on the frame of the machine and driven by belt 89 and pulley 90 from the pulley 37 on shaft 36 heretofore described. Said pump has its inlet connected through piping 91 with the storage tank 87, and its outlet connected through piping 92 and the flexible pipe 93 with the inlet of said coupling 71. Piping 92 is also extended forwardly as shown in Fig. 1, and communicates through flexible piping 93' with one or more jointed sections 94 leading to an outlet 94' which may be adjustably disposed over the tube to be drawn adjacent where the tube is being forced through the die (see Fig. 2a), to the end that the outer surface of said tube may be lubricated and thereby the frictional opposition of its passage through the die be reduced. The lubricant discharged through the outlet 94' is also collected in the sump tank 85 and returned to the storage tank 87 as heretofore described.

The forward end of the punch 61 is provided with a conical recess 95 (Fig. 4a) behind which is an axially extending cylindrical recess 96. These recesses are designed to receive a tail piece which is inserted into and supported in the end of the punch before the tube is placed over the punch. Said tail piece has a cylindrical portion 97 of the same diameter as the end of the punch, a conical portion 98 designed to fit loosely into the recess 95, and a stem 99 designed to be received in the recess 96. Projecting from the portion 97 of the tail piece is a shank 100 which is connected by a conical surface 101 to a head 102 which is coned in the opposite direction for a purpose to be explained. The tube to be acted upon is provided with an inwardly directed flange 103, as shown in Fig. 4a, which flange may conveniently be formed by making the tube originally with a closed end and punching out an aperture which will permit the head of the tail piece to be inserted therethrough. If desired, the end of the punch may be slightly reduced in diameter, with the portion 97 of the tail piece of corresponding diameter, and the end of the tube may be swaged so as to fit this smaller diameter, although this will ordinarily be unnecessary because of the manner in which the end of the tube is gripped to the tail piece as hereinafter explained.

When the machine is not in operation the punch is preferably held in an upwardly inclined position, as shown in Figs. 1, 1a, 2, 2a, 18, and 18a, so that the tube may be readily inserted over the punch. The punch is preferably moved to this inclined position automatically as soon as the punch and die block are separated, and when the tube has been placed over the punch and the machine is to be started, means are provided whereby the punch and tube are lowered automatically into axial alignment with the die.

Any suitable means may be provided for raising and lowering the punch, the mechanism illustrated including a pneumatically actuated means, although hydrostatic, electric or mechanical means may be employed if preferred. In the form shown a cylinder 110 is supported in any suitable way from the frame of the machine (Figs. 2 and 18), as by straps 111, and working within said cylinder is a piston 112 to which is connected the piston rod 113 projecting through the detachable head 114 of the cylinder. The upper end of the piston rod 113 engages the underside of a relatively-long bar-like member 115 pivoted at 115' (see Fig. 1a) to the frame of the machine at a considerable distance forwardly of said piston rod so as to have a relatively small change in angularity in its upper and lower positions. Said member 115 has suitably attached thereto a track 116 designed to cooperate with the roller 76 carried by the coupling of the punch rod heretofore described. When the piston is in its uppermost position, the track is elevated and, through the action of the track on roller 76, the punch rod and punch are held in their upwardly inclined position. If the machine should be accidentally started when the punch is in this position, no breakage will occur because the ram, although reciprocating the punch rod, will merely cause the punch rod to roll backward and forward on the track 116, and there will be no injury of parts as would occur if the piston rod were positively connected to the punch rod. The cylinder 110 has inlet connections 117 and 118 connected, through piping 119 and 120 respectively, to valve mechanism to be described for determining when pressure shall be applied to the underface of the piston 112 to lift the punch and when pressure shall be applied to the upperface of said piston to lower the punch.

When the punch rod is in its lowered or operating position, in axial alignment with the die, it is preferably guided laterally so as to prevent it from springing. To this end means are provided for automatically engaging and guiding the punch rod when lowered, and for releasing the punch rod when it is to be raised. In the form shown (Fig. 18a), a pair of yokes 121 and 122 are pivotally mounted in any suitable way on the frame of the machine at 123 and 124 respectively. The upper extremity of each yoke is bifurcated and carries a grooved roller 125, said rollers being held at such an inclination that when in operative position they engage and guide the opposite sides of the punch rod as it reciprocates forwardly and backwardly. The lower end of yoke 121 is pivotally connected at 126 to a piston rod 127, while the lower end of yoke 122 is pivotally connected at 128 to a rectilinearly movable cylinder 129 which contains the piston connected to the rod 127. Cylinder 129 has inlet connections 130 and 131 at opposite sides of the piston, which connections communicate with piping 132 and 133 leading to valve mechanism to be described for determining when pressure shall be admitted to the respective sides of said piston. Mounted upon the opposite frame members for cooperation with the aforesaid pivoted yokes, are adjustable stop members 134 (see Fig. 3a). When pressure is admitted through the connection 130 to the cylinder 129 the piston rod 127 is moved toward the left as viewed in Fig. 18a until yoke 121 engages its stop 134, after which the reaction of the pressure on the cylinder 129 causes said cylinder to move toward the right as viewed in said figure until yoke 122 engages its adjustable stop 134. The upper ends of the yokes 121 and 122 are thus moved inwardly in sequence until the rollers 125 are properly positioned for engaging and guiding the punch rod.

The punch heretofore described is designed to cooperate with a die 135 of any suitable construction and of a size selected in conformity with the diameter of the tube to be drawn. Said die 135 (Figs. 2a and 4a) is mounted in any suitable way, as by a retaining plate 136 and bolts 137, on the head 138 of a rectilinearly movable die block 139. Said die block is shown as of generally channel-shaped cross section and provided with longitudinally extending lateral ribs 140 and 141 (Fig. 20) for cooperation with ledges 142 constituting ways and retaining plates 143, so that said block may be moved forwardly and rearwardly on the longitudinal frame members and guided and retained thereon. The ledges 142 may be continuations of the ledges 53, and the cross section of the die block, and the manner of supporting, guiding and retaining the same, may therefore be the same as for the ram.

For moving the die block forwardly and rearwardly, the block is suitably provided, adjacent its rearward end, with a depending cylindrical boss 144 apertured and threaded to constitute a feed nut. Cooperating with said nut and mounted in suitable bearings on the frame is a feed screw 145 which carries a beveled pinion 146. Meshing with said pinion 146 is a beveled pinion 147 secured to a shaft 148 (see Figs. 11 to 15). Rotatably mounted on shaft 148 are pairs of sleeves 149 and 150 to which are respectively keyed beveled pinions 151 and 152, both of which are in mesh with the beveled pinion 38 on the shaft 36 heretofore described. The sleeves 149 and 150 at their inner ends are provided with conical clutch shells 154 and 155 respectively. Keyed to the shaft 148 and extending between shoulders on said clutch shells is a sleeve 156 to which is slidably keyed a double-coned clutch block 157 for selectively engaging the one or the other of the clutch shells 154 and 155, which shells may be suitably lined with any appropriate friction material 158.

To shift the double coned block 157, the sleeve 156 is provided with a plurality of apertures 160 in which are fulcrumed a plurality of shifter pins 161 having curved heads 162 at their inner extremities for engagement in said apertures 160. Said shifter pins 161 extend through apertures 163 in the intermediate portion of the double coned block 157, where they are provided with curved enlargements 164 for cooperation with the walls of said apertures 163. The outer extremities of said pins 161 have curved heads 165 and engage in threaded blocks 166 carried by a clutch shifter sleeve 167 which is reciprocatingly mounted on cylindrical extensions 168 at the extremities of the clutch shells 154 and 155. Said sleeve, intermediate its length, is provided with an annular rib 169 in which the blocks 166 are carried, and cooperating with said rib is a bifurcated shifter member 170 terminating in a spherical head 171 (Fig. 18). Said spherical head 171 is embraced in a socket on the end of a lever 172 pivotally mounted on a bracket 173 projecting from the framework, and said lever is pivotally attached at its opposite extremity 174 to a vertically extending link 175 which is pivotally attached to a bell crank lever 176 (Fig. 1) pivotally mounted at 177 on the frame. The opposite end of said bell crank 176 is pivotally connected to a link 178 which extends forwardly to the operator's position at the machine (Fig. 1a) where it is pivotally attached to an operating lever 179.

It will thus be perceived that as lever 179 is moved to either of the positions designated B for backward and F for forward from its position designated N for neutral, the link 178 will be moved forwardly or backwardly to actuate the bell crank 176, the link 175, the lever 172 and the shifter 170, and move the clutch shifter sleeve 167 in one direction or the other to tilt the pins 161 about their inner extremities 162 as fulcra and thereby shift the double coned block 157 in the appropriate direction for engagement with one or the other of the clutch shells 154 and 155, thereby clutching one or the other of the beveled pinions 151 and 152 to the shaft 148, whereby the shaft 145 will be rotated in the proper direction to feed the die block 139 either forwardly or rearwardly.

The pistons for raising and lowering the punch and for moving the guide rollers 125 for the punch rod are preferably operated automatically, and in sequence, by the movement of the die block. To this end, the pipes 119 and 120 are extended forwardly to a valve casing 185 having a vent pipe 186 and an operating member indicated at 187, the valve being of the general type illustrated in Figs. 16 and 17 and hereinafter described. Similarly, the pipes 132 and 133 are extended forwardly to a valve casing 188 having a vent pipe 189 and an operating member indicated at 190. Suitably secured to the die block, and shown as secured to the lug 144 thereon, is a depending pivotal arm 191 (Fig. 18a) which is pivotally connected at 192 to a rod 193 suitably mounted for reciprocation in the frame of the machine. Said rod 193 carries a depending pin 194 for operating the valve member 187 and a depending pin 195 for operating the valve member 190, said members 187, 190 having bifurcated ends for coaction with said pins 194 and 195 (see 329', Fig. 3a). Said valves may be supplied with pressure fluid, as compressed air, through a common supply pipe 196 (Fig. 18a).

As the die block moves rearwardly, or toward the power end of the machine, into operative position with respect to the punch, it reciprocates the rod 193 in the same direction, and the pin 194 first operates the valve member 187 to admit pressure to the cylinder 110 and cause the punch to be lowered. Thereafter the pin 195 operates the valve member 190 to admit pressure to the cylinder 129 and cause the guide rollers 125 to move into cooperative relation with the punch rod. This relationship is maintained during the drawing of the tube. After the tube is drawn, the die block is moved forwardly, or away from the power end of the machine to free the punch, and the depending pins 195 and 194 operate the valve members in reverse sequence to cause the removal of the guide rollers 125 and then the lifting of the punch.

The die block is also preferably provided with means adjacent the die for guiding the punch and the tube carried thereby into cooperative relationship with the die. In the form shown, (see Figs. 2a and 4a), a V-shaped die block 197 is adjustably mounted by means of a nut 198 attached thereto on an inclined screw 199 journaled in a bracket 200 suitably secured to the base of the die block adjacent the head thereof. The end of the screw 199 is squared as shown at 201 so that a wrench or key may be applied thereto to rotate the screw and feed the guide block 197 forwardly or rearwardly, this movement, owing to the inclination of the feed screw, causing the crotch in the die block to be raised or lowered to such a posiiton that it properly guides the punch and tube into cooperative relation with the die.

Extending forwardly from the ram, and carried by the apertured lugs 60 heretofore described, are a pair of rods 204 (Figs. 18 and 18a) respectively coupled to a pair of feeding rack bars 205, said rods being suitably secured to the lugs 60, as by nuts 206. Said feeding rack bars extend forwardly throughout the remainder of the length of the machine, and are guided and supported at their forward ends in apertured guide blocks 207 (Fig. 8) suitably secured to the end wall of the frame, as by bolts 209. Said rack bars are provided with keyways 210 for cooperation with short key sections carried by keyblocks 211 (see Fig. 1b) suitably mounted, as by bolts 212, at spaced points along the length of the frame members, although if desired a continuous key may be provided for said rack bars. Said rack bars have their axes in the horizontal plane of the axis of the punch and the tube being drawn, and by reason of their support at their opposite extremities and a plurality of points intermediate their lengths, by the keys 211, said rack bars are prevented from springing out of their proper relationships to the parts cooperating therewith and actuated thereby.

Mounted in suitable ways for reciprocation in the side frames of the machine, between the die block and the forward end of the frame, is a tail block 215 (Fig. 5). Said tail block may be of any suitable construction, but is preferably in the form of a casting having strengthening flanges as shown in Fig. 5. Suitably secured to each side of said block, as by screws 216, are a pair of thick plates 217 which are received in the channel-shaped openings 218 (Fig. 21) in each of the side frame members, said plates affording bearings for the shafts in the tail block hereinafter described.

Each of the rack bars 205 is provided on both of its upper and lower surfaces with a series of teeth 220, (Fig. 18a), said teeth having their abrupt faces toward the rear or power end of the machine and easy inclines toward the opposite end of the machine, and spaced by distances somewhat less, on the order of $\frac{1}{16}''$, than the total reciprocatory movement of the ram. Mounted in said tail block are two pairs of pushing or feed pawls 221 (Fig. 6); one pair at each side for cooperation with each rack, and two pairs of restraining pawls 222, one pair at each side. Each side frame of the machine carries on each of the upper and lower edges of the channel-shaped recess therein a stationary restraining rack 223 having a series of teeth 224 for cooperation with said restraining pawls 222 and adjustably secured to the side frames of the machine by bolts 227 (Fig. 21). Said teeth also have their abrupt faces toward the rear or power end of the machine, with easy inclines toward the opposite end of the machine, and are spaced by the same distances as the teeth 220 on the racks 205. In order to provide for their proper setting the feed racks have adjustable couplings 225 (Fig. 18a) with their rods 204, and adjusting bolts 229 (Fig. 2b) extend between the racks 223 and lugs 230 to provide longitudinal adjustment of the racks 223. The tail block is retained and guided in its reciprocatory movements on the side frames of the machine by longitudinally extending plates 226 (Fig. 21) suitably attached to the side frames as by bolts 228, and adjustable vertically by reason of bolts 231. The weight of said tail block is carried by rollers 218' suitably mounted on said tail block and running on the lower ledge of the channel-shaped recess 218.

The feeding and restraining pawls 221 and 222 are so mounted that they may be simultaneously moved into and out of cooperation with their respective racks. As shown in Fig. 6, each of the upper feed pawls 221 is mounted on a rockshaft 235 and each of the lower feed pawls 221 is mounted on a rockshaft 236. Secured to the rockshaft 235 is a sleeve 237 from which projects a downwardly extending arm 238 which is pivoted at 239 to an upwardly extending arm 240 from a sleeve 241 secured to the rockshaft 236. Sleeve 237 has an axially extending arcuate extension 242 which works in the arcuate slot of a sleeve 243 loosely mounted on the rockshaft 235. From this sleeve 243 extends an arm 244 which is pivotally connected at 245 to an arm 246 carried by a sleeve 247 which is loosely mounted on a rockshaft 248. Said sleeve 247 has an arcuate slot 249 in which works an axially extending arcuate projection 250 on a sleeve 251 secured to the rockshaft 248. The upper restraining pawls 222 are secured to the rockshaft 248. Sleeve 251 also has a downwardly extending arm 252 which is pivotally connected at 253 to an arm 254 extending upwardly from a sleeve 255 secured to a rockshaft 256 on which the two lower restraining pawls 222 are secured. Since rockshafts 235, 236, 248 and 256 are relatively fixed with respect to one another, it will be understood that the pivotal connections at 239, 245 and 253 may be of any suitable type which will allow a limited displacement of the arms thus connected with respect to one another. Sleeve 243 also carries a downwardly extending bifurcated operating arm 257 which straddles and is operated by an adjustable nut 258 threaded onto an operating rod 259.

It will thus be perceived that when the rod 259 is moved to the left as viewed in Fig. 6, the arm 257 will be moved in a clockwise direction to similarly rotate the sleeve 243. Sleeve 237 will be rotated in the same direction, lifting the upper feed pawls 221 out of engagement with the racks on the upper faces of the rackbars 205. The arm 238, moving in a clockwise direction, moves the arm 240 in an anticlockwise direction, and thereby moves the lower feed pawls 221 out of engagement with their respective racks. Arm 244 will also move in a clockwise direction moving arm 246 in an anticlockwise direction, causing sleeve 251 to move in a similar direction and thereby moving the upper restraining pawl 222 out of engagement with their respective racks, and the anticlockwise movement of the arm 252 will cause a clockwise movement of the arm 254 and thereby the lower restraining pawls 222 will be lifted out of their respective racks. Thereby all of the pawls are simultaneously actuated to withdraw them from their respective racks. Similarly, the movement in the opposite direction of the respective parts will cause all of the pawls to simultaneously engage their respective racks, under the action of the spring 259' attached to arms on the pivot pins 239 and 253, or the system may be so weighted as to cause this movement by gravity, when nut 258 moves away from arm 257.

Rod 259 is preferably operated automatically, being shown as operated by pneumatic means, although hydrostatic, electric or mechanical means may be employed if desired. As shown, the rod 259 is connected to a piston 260 (Figs. 2b and 4b) operating in a cylinder 261 which is suitably mounted in the tail block, as by bolts 262. Pipes 263 and 264 lead to the opposite ends of the cylinder 261 and may be suitably supported by spring arms 265, as illustrated. Said pipes extend to a valve casing 266 (Fig. 1a) having a vent pipe 267 and an operating member indicated at 268. Operating member 268 (Fig. 18a) is pivotally connected to a link 269 which in turn is pivoted to an arm 270 carried by a rotatable rod or rock shaft 271 which extends lengthwise of the frame of the machine the full length of the travel of the tail block. Adjacent one extremity of said rod 271 there is an inwardly projecting operating arm 272, and adjacent the opposite extremity of said rod is a second inwardly projecting operating arm 273. Operating arm 272 is actuated by a wedge-shaped head 276 carried by a pivoted arm 275 and normally resting by gravity on the projection 274 of a bracket 277 projecting downwardly from the tail block. Operating arm 273 is actuated by the beveled face 278 of a depending lug 279 suitably secured to the tail block.

As the tail block reaches the forward extremity of its movement face 278 of lug 279 engages and depresses the arm 273 to rotate the rod 271 and move the valve member 268 in such direction as to admit air to the forward end of the cylinder 261, whereby the rod 259 is moved toward the power end of the machine to remove all of the pawls from engagement with their respective racks and prevent further feed of the tail block. When the tail block is moved in the opposite direction up to the die block, the arm 275 is raised by engagement with arm 272, the latter passing between the head 276 and the projection 274, after which the head 276 falls back onto the projection 274. During the first stroke of the machine the tail block moves to the right as viewed in Figs. 18, 18a and 18b, and the arm 272 is engaged by the cam surface 276 to rotate the rod 271 to its original position, to admit air to the opposite end of cylinder 261 and operate rod 259 and the parts controlled thereby in the opposite direction. The parts remain in this latter position until the face 278 again engages and depresses the operating arm 273.

The tail block heretofore described also constitutes drawing mechanism, and is provided with means for attachment to the tail piece heretofore described. To this end, the rod 259 extends rearwardly through a bearing 285 secured in a rearwardly extending projection 286 on the tail block. Projection 286 also carries a tube 287 suitably retained in the projection 286, as by lock nuts 285'. The rearward extremity of said tube 287 has suitably mounted thereon, as by a threaded connection, a chuck head 288, (Fig. 4a) in which are pivotally mounted at 289 a plurality of levers 290 having curved extremities 291 which engage in apertures in jaw pieces 292 which are reciprocatingly mounted in apertures in said chuck head. The forward or inner faces 293 of said jaw pieces have the same inclination as the rear face 101 of the head of the tail piece, so that when said jaw pieces engage said surface the rear or outer face 294 of the chuck head is forced into clamping engagement with the end flange on the tube, clamping the same fixedly between the portion 97 of the tail piece and the chuck head. To actuate said levers 290, they are provided with inwardly inclined extensions 295 for cooperation with a head 296 adjustably mounted, as by a screw threaded connection and lock nut, on the end of the rod 259. When the rod 259 is moved forwardly by the piston 260, to permit the pawls to reengage their respective racks, the head 296 acts on the lever extensions 295 to force the jaw pieces into engagement with the head of the tail piece, thereby gripping the tail piece and clamping the tube thereto.

Also mounted within the chuck head is a coil spring 297 abutted against a wall thereof and at its outer end pressing on a cylindrical member 298 having a coned aperture, the inclined wall of which mates with the inclined surface 102 on the head of the tail piece. When the tail block is moved into engagement with the tail piece the member 298 engages the head of the tail piece and compresses the spring, and the spring is retained in its compressed condition by the engagement of the jaw pieces 292 with said head, until the levers 290 release said jaw pieces, whereupon said spring expands to eject the tail piece from the chuck head, also releasing the drawn tube from the tail block or drawing mechanism. If desired the machine may be provided with a suitably shaped receiving plate 300 (Fig. 3a) onto which the drawn tube with its tail piece will drop, said receiving plate being suitably shaped and inclined so that the drawn tube will roll out of the machine between the uprights of its framework.

When the tail block is moved up to the die block in the manner next to be described, the head 296 on rod 259 has been moved into its rearward position at the same time that the pawls are released from their respective racks, and the jaw pieces are therefore free to slip over the head of the tail piece and engage the same behind the head. As the tail block moves on its first forward stroke the valve member 268 is operated by the engagement of head 276 with arm 272 on rock shaft 271, thereby admitting air to the rear face of the piston 260. Therefore, the piston 260 and rod 259 are moved forwardly, and the head 296 operates the tail extensions 295 of the chuck jaws to firmly lock the chuck jaws in engagement with the tail piece, and this relationship is maintained throughout the drawing operation.

The tail block is preferably moved at a fairly high speed into its position adjacent the die block, as no work is being performed during this movement, the parts being repositioned for the drawing of a new tube. To provide for the relatively rapid movement of the tail block, and also to reduce the stroke of the member which effects this movement, there is suitably mounted on the frame of the machine a cylinder 303 (Figs. 2a and 17a) within which works a piston 304 that is connected to a rod 305. Rod 305 is connected to a frame 306 (Fig. 2b) suitably guided on the frame of the machine and carrying pulleys 307 and 308. A cable 309 is suitably attached to the framework at 310, from which it extends around the pulley 307, and then rearwardly around the pulley 311 suitably mounted in a bracket 312 on the machine frame adjacent the end 310. The cable 309 then extends forwardly around a pair of guide pulleys 313 mounted at the forward end of the machine, and thence to a downwardly extending projection 314 on the tail block, to which said cable is suitably attached. The cable then extends around the pulley 308, and then forwardly to an attachment 315 at the forward end of the machine. When the piston 304 is moved toward the power end of the machine, its rod 305 moves the frame 306 in the same direction, and owing to the speed and distance multiplying mechanism just described, the tail block is moved toward the power end of the machine at increased speed.

To admit the operating fluid to the cylinder 303, valve mechanism 316 is provided at the operator's position. This valve mechanism may be similar to that shown in detail in Figs. 16 and 17, which is typical of the valve mechanisms employed for admitting the operating fluid to cylinders 110, 129 and 261. Said valve mechanism includes a casing 317 suitably secured to the framework and provided with an inlet passage 318, outlet passages 319 and 320, and an exhaust passage 321. Mounted within a recess 322 in said casing is a conical valve plug 323 provided with two ducts 324 and 325. Said valve plug has a rectangular aperture 326 designed to receive a rectangular projection 327 on the valve stem 328, which also carries an operating member 329 secured thereon by nut 330. The valve stem is suitably journaled in the cap 331 of the casing, and the valve plug is retained in its seat by a coil spring 332 which surrounds the stem and is compressed between the valve plug and the casing cap.

As shown in Fig. 17, when the valve plug is in one position one of the ducts 324 and 325 connects the inlet passage with one of the two outlet passages, while the other duct connects the other outlet passage with the exhaust passage. By movement of the valve plug through 90° the conditions are reversed. In the case of valve 316, however, the valve is not reversible as the operating fluid is admitted to the cylinder to move the piston 304 in one direction only and the piping leading to said valve is therefore simplified, as shown.

In order to brake or cushion the movement of the tail block as it comes into its position adjacent the die block, and thereby prevent the tail block being brought to rest by a sudden and possibly destructive impact with the die block, the exhaust pipe from cylinder 303 is connected to piping 327' which extends to a valve casing 328' having an operating member 329' in the path of a pin on a downwardly extending projection 330' on the tail block. Just before the tail block reaches its rearward position, projection 330' operates valve member 329' to throttle or close the exhaust line 327' from cylinder 303, allowing air to collect between the piston and the rear end of the cylinder 303, whereby the rearward movement of the piston 304 is retarded and cushioned and the shock absorbed. As the tail block moves forwardly on its next stroke the valve member 329' is again operated to open the valve in preparation for the next return of the tail block.

Suitable means are provided at the operator's position for controlling the starting and the stopping of the machine. In the form shown, the clutch 39 heretofore referred to has a clutch operating lever 335 (Fig. 18) pivoted at 336 on the frame of the machine and engaging in a groove of a collar 337 mounted on a sliding rod 338 supported in suitable bearings on the frame of the machine. Rod 338 also has attached thereto a collar 339 from which projects an arm 340 that is connected by a pair of links 341 to the arms of brake levers 342 pivoted at 343 on the frame of the machine. Said links 341 have ball and socket connections with the brake levers 342 and the arm 340, and constitute a toggle mechanism whereby when the rod 338 is moved to the right, as viewed in Fig. 18, the clutch lever is thrown out and the brake levers are spread apart to brake the drum 40, stopping the driven mechanism instantly at that point in their cycle of operation at which the clutch is thrown out, while if the rod 338 is moved to the left as viewed in said figure, the brake levers are moved out of braking position and the clutch is thrown in, the machine thereby starting at the predetermined point in its cycle of operation.

To reciprocate the rod 338 a stud shaft 344 is suitably journaled in the frame of the machine and carries an arm 345 which engages in a slot 346 in the rod 338. Stud shaft 344 also carries a second arm 347 to which is pivotally connected at 348 an operating rod 349 which extends forwardly to approximately opposite the operator's position, where it is pivotally connected at 350 to an arm 351 secured to a rockshaft 352. Said rockshaft 352 is extended transversely of the machine to the operator's position and provided with the operating handle 353, by which said shaft may be operated as hereinafter described.

In order that the machine may also be started by foot power, a foot plunger 355 is reciprocatingly mounted in a bracket 356 and pivotally connected at 357 to an arm 358 carried by a rockshaft 359. Pivotally attached to the arm 358 is a rod 360 which extends upwardly through a second bracket 361 and carries a compression spring 362 between said bracket and a head 363 suitably attached to said rod, whereby the foot plunger is returned to its normal position when released. The opposite end of rockshaft 359 carries a sleeve 364 from which projects an arm 365 that is pivotally connected at 366 to a link 367 that at its opposite end is pivotally connected to a cam 368 loosely mounted on the rockshaft 352. Depression of the plunger 355 starts the machine through movement of the cam 368 in the manner next to be described.

Means are preferably provided for automatically predetermining the point in its cycle of operation at which the machine is started and stopped; for example, so that the machine will be started only at that point of the cycle of operation at which the ram starts to move forwardly to move the punch and tail block forwardly to effect a drawing action on the tube, and so that the machine will be stopped at this same point in its cycle of operation. To this end, the crank shaft is provided with an extension 370 on which is mounted a disk 371 carrying an eccentric pin 372 which, if desired, may be adjustably mounted thereon and to which is pivotally attached a rod 373. Rod 373 at its opposite end is pivotally connected to a pin 374 (Fig. 18) carried by an oscillating arm 375 pivotally supported on the frame of the machine at 376. Pivot pin 374 also carries one end of a second rod 377 which at its opposite end is pivotally connected at 378 to an arm 379 projecting upwardly from a sleeve 380 which is loosely journaled on the rockshaft 352. Pivotally mounted on the arm 379 (Figs. 21 and 22) at 381 is a pawl-like member or detent 382 having a depending nose 383 and a downwardly extending arm 384 for cooperation with the cam 368. A spring 385 is attached to pins projecting respectively from the arm 379 and the arm 384. Secured to a sleeve 352' on the rockshaft 352 is a collar 386 carrying an upwardly extending arm 387 adapted to cooperate with the detent 382, said collar 386 also carrying a laterally extending arm 388 which is bifurcated at its extremity and engages in circumferential slots formed at the opposite sides of a plunger 389. Said plunger at its lower end works in a cylinder 390, and forms a dash pot therewith. The upper end of the plunger 389 works in a cylindrical bearing bracket (389' omitted from Fig. 18a for purposes of clearness), and a coil spring 391 is interposed between said plunger and an adjustable collar 392 mounted on said bracket.

The operating handle 353 is loosely mounted on a hub 353' carried by the rockshaft 352 and has pivotally mounted thereon at 395 a pawl 396 having a hook nose 397 adapted to engage in an arcuate slot 398 formed in a sleeve 399 keyed to the rockshaft 352. The slot is formed by cutting an L-shaped piece out of the periphery of sleeve 399, thereby forming a shoulder which the hook end 397 of said pawl 396 engages due to gravity when the operating handle 353 is properly positioned with respect thereto, and this relationship is retained by the engagement of the hook end 397 with the end of the slot unless the pawl 396 is tripped. When the foot plunger 355 is to be used, however, the operating handle 353 is to be rendered inoperative, and to this end the rockshaft 359, or the hub of the arm 358, is provided with an arm 400 having an adjustable protection 401 in the path of the lower extremity of the pawl 396, so that when the foot plunger 355 is depressed, the arm 400 rises and its projection 401 tips the pawl to disengage its end 397 from the slot 398, whereupon the operating handle 353 will fall by gravity into inoperative position, in engagement with the projection 402.

The sleeve 352' is designed to be clutched to rockshaft 352 at appropriate times, and to this end a rolling key clutch 405 is provided therebetween. The members of said key clutch 406 and 407 are disposed in a slot 408 in the shaft 352 and sleeve 352', the member 407 projecting through the longitudinal slot 408' in the sleeve 399 and having a radially extending portion 410 which is disposed in a radial slot 409 and normally urged by a torsion spring 411, having its end secured in a slot on a projection 411' on the key member 407 and positioned in a slot 412 of the hub 353' of the operating handle 353, said spring being retained in said slot by a tensioning plug 412' and a set screw 413' engaging a slot therein, and tending to rotate said key clutch member 407 in a clockwise direction. Said handle 353 also carries a projection 414 adapted to engage the radially extending portion 410 of the key clutch member 407 and rotate it in the slot 408 against the tension of the spring 411, to declutch the sleeve 352' from the shaft 352. The parts are retained in assembled relation by a plate 415 and cap screw 416.

If the machine is to be started by hand, with the operating handle 353 in the position shown in Fig. 18a, said handle 353 is first moved in an anticlockwise direction. This causes the projection 414 thereon to engage the radially extending portion 410 of the rolling key clutch member 407 and rotate it in an anticlockwise direction to declutch the sleeve 352' from the rockshaft 352. The hook 397 of pawl 396 now engages in slot 398, and with the clutch member 407 held in declutched position by projection 414 holding projection 410 against the end of slot 409, the rockshaft 352 may be operated by the operating handle 353, through the action of the hook end 397 of the pawl 396 on the end of the slot 398 in the sleeve 399 that is keyed to said rockshaft 352. By moving the operating handle 353 in a clockwise direction, the sleeve 399 and rockshaft 352 are rocked by action of the pawl 396 on the end of the slot 398, so as to move the member 351 in a clockwise direction and, through the rod 349, throw in the clutch 39 and release the brakes 40. Movement of the operating handle 353 in the opposite direction causes the rockshaft 352 to rock in the opposite direction, the sleeve 399 being rotated by the action of the projection 414 holding radial projection 410 against the end of slot 409, and thereby the clutch is thrown out and the brakes applied.

When the machine is to be started and stopped by the foot plunger, as is the designed operation for normal conditions, and assuming that the parts are in the position shown in Fig. 18a, and that the sleeve 352' is keyed to the rockshaft 352 by the rolling key clutch 405, the machine is started by depressing the foot plunger 355. If the operating handle 353 is not already disconnected, the arm 400 will rise and its projection 401 will tip the pawl 396 so as to release the operating handle 353, and permit it to fall into engagement with the projection 402. Depression of the plunger 355 will rock the shaft 359 to move the arm 365 in an anticlockwise direction and cause rotation of the cam 368 in a clockwise direction. Cam 368, by its cooperation with the arm 384 of pawl 382, will lift the nose 383 from engagement with the arm 387, releasing said arm and permitting the spring 391 to move the arm 388 and its associated arm 387 in a clockwise direction. Thereby the sleeve 386, to which said arms are attached, is moved in a clockwise direction, by said spring 391, and as sleeve 352', to which sleeve 386 is keyed, is keyed to rockshaft 352, by the rolling key clutch 405, the latter will be moved in a clockwise direction to throw in the clutch 39 and release the brakes 40. As long as the foot pedal is depressed the pawl 382 is held in its tilted position, and as the arm 379 is oscillated back and forth by the rod 377 under the action of eccentric 372, said pawl will merely rock on said arm 379 within the limits determined by the rocking engagement of the end of the arm 384 with the cam 368. As soon as the foot pedal 355 is released, however, the spring 362 rocks the shaft 359 in the opposite direction, restoring the cams 368 to inoperative position and permitting the pawl 382 to fall to its normal position, so that at the next clockwise stroke of said pawl, its hook end 383 will engage with the end of the arm 387, and on the reverse stroke it will rotate said arm and the parts connected therewith, against the tension of the spring 391, so as to move the rockshaft 352 in an anticlockwise direction, and thereby throw out the clutch 39 and apply the brakes 40.

It will be perceived that during this normal operation of the machine, the machine is always stopped at a predetermined point in its cycle of operation, i. e. that point at which eccentric 372 has effected the movement of arm 379 to move, through the pawl 382, the arm 387 to the position shown in Fig. 18ᵃ, and when the foot pedal 355 is again depressed, the machine is ready to resume its cycle of operation at the same predetermined point.

The machine can be stopped at any point of its cycle by an anticlockwise movement of the operating handle 353. As said handle is moved in an anticlockwise direction, its projection 414 engages the key clutch projection 410 and declutches the sleeve 352' from the rockshaft 352, at the same time reengaging the hook 397 of pawl 396 in the arcuate slot 398, and thereby rotating the sleeve 399 and actuating the rockshaft 352 in an anticlockwise direction, as heretofore explained, to throw out the clutch 39 and apply the brakes 40.

If the machine is stopped with the arm 387 out of engagement with the pawl 382, it may be restarted by operation of the operating handle 353 in the manner above described, and at the first oscillation of the pawl 382, the arm 387 will be engaged and moved in an anticlockwise direction, rotating the sleeve 352' in the same direction. As the sleeve 352' moves with respect to the rockshaft 352 to such a position that the torsion spring 411 can move the key clutch member 407 into operative clutching relationship, the sleeve 352' will be keyed to the shaft 352, and the latter will be rotated in an anticlockwise direction to throw out the clutch and apply the brakes. The parts are now in the normal operating position, ready for the machine to be started by depression of the foot pedal 355 as heretofore explained.

*Operation.*—The machine at starting is in the position shown in Figs. 1, 1ᵃ and 1ᵇ. Assuming that the electric motor 29 is running, the belt 31 is driving the pulley 32 and the shaft 33. The worm 34 on shaft 33 is driving the worm wheel 35 and shaft 36, and the bevel gears 38, 151 and 152 are turning idly. The pulley 37 is also operating pump 88 to withdraw lubricating fluid from the storage tank 87 and force it through the passages in the punch rod and punch and to the outlet 94'. The crank shaft 46 is not being driven, however, because the clutch 39 has not been thrown into operative position and the brake arms 342 are in braking relation to brake drum 40. The punch and punch rod are in the upwardly inclined position shown in Figs. 1 and 1ᵃ.

Assuming that a tail piece has been mounted in the end of the punch as heretofore described, a tube having a flanged end as shown in Fig. 4ᵃ, is slipped over the punch until its flanged end engages the tail piece. The operator then moves the lever 179 in an anticlockwise direction, to the position marked B in Fig. 1ᵃ. This movement of the lever 179 effects the operation of the double throw clutch shown in Fig. 11, to clutch one of the beveled gears 151 and 152 to the shaft 148, whereby the beveled gear 147 is driven to drive the feed screw 145 through beveled gear 146 in the appropriate direction for moving the die block toward the power end of the machine.

As the die block moves rearwardly its arm 191 slides the rod 193 rearwardly and pin 194 operates the valve member 187 to admit pressure to the upper end of the cylinder 110, lowering the piston rod 113 and the track 116, whereby the punch is lowered into alignment with the axis of the die. The pin 195 then operates valve member 190 to admit pressure to the cylinder 129, whereby piston rod 127 first moves its yoke 121 until it engages its stop, and thereafter the cylinder 129 moves its yoke 122 until it engages its stop, thereby moving the rollers 125 into contact with the punch rod to guide the same and prevent it from springing during the drawing operation. The operating handle 179 is then returned to its initial position, disconnecting the feed screw, although if desired means may be provided on the die block for automatically returning the operating lever 179 to its neutral position just as the die block reaches its rearward position.

Assuming that the tail block is in its extreme forward position, as would be the case when starting the machine, the operator now moves the valve mechanism 316 and pressure is admitted to the forward end of cylinder 303 and air is permitted to exhaust from the rearward end of said cylinder. The piston 304 is thus moved rearwardly and, through the frame 306 and cable 309, the tail block is moved rapidly up to its position adjacent the die block. As it approaches this position its projection 330' operates the valve member 329' to throttle the exhaust from the cylinder 303, and thereby the tail block is brought to rest gently at its rearward position. Just as the tail block is reaching this position, the head 276 on pivoted arm 275 carried thereby passes over the operating arm 272 and drops into position to actuate said arm 272 on the reverse stroke. As the tail block reaches its extreme rearward position the chuck jaws 292 snap over the head of the tail piece and the spring 297 is placed under compression.

The operator now steps on the foot plunger 355, or he may move the operating handle 353 in a clockwise direction, and assuming that the machine has been stopped in its cycle of operation with the arm 387 in engagement with detent 382, the operating rod 349 is moved to the right as viewed in Fig. 18, opening the brake levers 342 and closing the clutch 39.

As the ram moves forwardly the punch is moved forwardly, and at the same time the feed rack bars 205 are moved forwardly, starting to move the tail block therewith. Wedge head 276 now actuates arm 272 and valve operating member 268, admitting pressure to the rearward end of the cylinder 261 and moving piston 260 and rod 259 to effect the engagement of the pawls 221 and 222 with their respective racks, and actuates the chuck jaws to grip the end of the tail piece and clamp the end of the tube thereto by reason of the action of the head 296 on the lever extensions 295. The abrupt faces of the teeth 220 on the upper and lower sides of said rack bars 205 are now engaged with the feed pawls 221, the tail block is therefore moved forwardly, carrying therewith the chuck head 288, which exerts a drawing action on the tube by reason of the action of the tail piece thereon. At the end of the forward stroke of the ram the restraining pawls 222 on the tail block engage with the teeth of the stationary restraining racks 223 and prevent the tail block following the ram in its rearward movement. The punch, however, accompanies the ram in its rearward movement and thereby moves into operative engagement with the next succeeding section of the tube to be drawn. At the end of this rearward movement the feed pawls 221 drop into cooperative engagement with the next teeth 220 on the feeding racks, and during the next forward movement of the ram, the tail block is again moved forward by the ram, and under the action of the punch and the drawing action of the tail block on the tube, a fresh section of the tube is drawn.

This action is repeated, successive sections of the tube being drawn by the cooperative action of the punch reciprocating within the die and the tail block drawing on the tube, the punch moving intermittently into operative engagement with the succeeding sections of the tube while the tail block stands still, until the entire tube is drawn.

Just as the tail block reaches its limit position the surface 278 on the projection 279 engages the operating arm 273 (which has been properly positioned by the action of cam head 276 on operating arm 272) to operate the valve operating member 268 and admit pressure to the forward end of cylinder 261. Piston 260 therefore moves rearwardly, removing all of the pawls from their respective racks, and relieving the levers 290 in the chuck head 288, whereupon the spring 297 ejects the tail piece, and the tube is released from the tail block or drawing mechanism and may then be withdrawn from the machine in any suitable way.

The clutch 39 and the brake 40 having been operated to stop the crank shaft by withdrawing the foot from plunger 355 or by manually operating the handle 353, as the case may be, the operator moves the lever 179 to the position marked F in Fig. 1ª, and the die block is moved forwardly by the feed screw 145, and the valve members 190 and 187 are operated in sequence to withdraw the guide rollers 125 and elevate the punch and punch rod in the manner heretofore described. The parts are now all restored to initial position ready for the positioning of a new tube on the punch and a repetition of the operation just described.

While the illustrated embodiment has been described with considerable particularity, it is to be expressly understood that the invention is not restricted thereto, as the same is capable of receiving a variety of mechanical expressions and various other embodiments of the invention will now readily suggest themselves to those skilled in the art, while changes may be made in the details of construction, arrangement and proportion of parts, and certain features used without other features, without departing from the spirit of the invention. For example, while pneumatic pressure has been illustrated for controlling various mechanism, the invention is not restricted thereto, as hydrostatic pressure or electrical power or mechanical means may be substituted where pressure operated means have been illustrated, or pressure or other operated controlling means may be substituted where mechanical controls have been shown. Reference is therefore to be had to the claims hereto appended for a definition of the limits of said invention.

What is claimed is:

1. In a machine for drawing tubes, in combination with relatively reciprocable punch and die elements for pushing a tube through said die, means for pushing said punch through said die, drawing mechanism adapted to operatively engage the advancing end of the tube and intermittently movable with said punch in one direction to pull said tube through said die at the same time as it is pushed by said punch, and means for moving said drawing mechanism comprising rack bars disposed at opposite sides of the axis of the punch and having their axes in the horizontal plane of the axis of said punch.

2. In a machine for drawing tubes, in combination with relatively reciprocable punch and die elements for pushing a tube through said die, means for pushing said punch through said die, drawing mechanism adapted to operatively engage the advancing end of the tube and movable with said punch in one direction to pull said tube through said die at the same time as it is pushed by said punch, and means for moving said drawing mechanism so disposed with respect to the horizontal plane through the axis of said punch that the forces acting on said drawing mechanism have balanced moments of force with respect to said plane.

3. In a machine for drawing tubes, in combination with relatively reciprocable punch and die elements for pushing a tube through said die, drawing mechanism adapted to operatively engage the advancing end of the tube and movable with said punch in one direction to pull said tube through said die at the same time as it is pushed by said punch, and means for moving said drawing mechanism with said punch comprising a pair of reciprocating feed racks disposed in the horizontal plane of the axis of said punch and pawls on said drawing mechanism cooperating with said feed racks.

4. In a device of the character described, in combination with relatively movable punch and die elements, drawing mechanism movable with said punch in one direction, and means for moving said drawing mechanism comprising a pair of reciprocating feed racks each having teeth on its opposite faces and pairs of feed pawls on said drawing mechanism cooperating with both faces of both feed racks.

5. In a device of the character described, in combination with relatively movable punch and die elements, drawing mechanism movable with said punch in one direction, and means for restraining said drawing mechanism from moving with said punch in the other direction, said means being symmetrically disposed with respect to the horizontal plane including the axis of said punch so that all moments of force acting on said restraining means are balanced with respect to said plane.

6. In the device of the character described, in combination with relatively movable punch and die elements, drawing mechanism movable with said punch in one direction, and means for restraining said drawing mechanism from moving with said punch in the other direction, said means including stationary racks at opposite sides of and in a horizontal plane with the axis of said punch and pawls on said drawing mechanism cooperating with said racks.

7. In a device of the character described, in combination with relatively movable punch and die elements, drawing mechanism movable with said punch in one direction, and means for restraining said drawing mechanism from moving with said punch in the other direction, said means including two pairs of stationary racks symmetrically disposed with respect to the axis of said punch and two pairs of pawls carried by said drawing mechanism and cooperating with said racks.

8. In a machine for drawing tubes, in combination with relatively reciprocable punch and die elements for pushing a tube through said die, drawing mechanism adapted to operatively engage the advancing end of the tube and movable with said punch in one direction to pull said tube through said die at the same time as it is pushed by said punch, means for feeding said drawing mechanism including a plurality of feed racks and feed pawls, and means for simultaneously withdrawing all of said pawls from said racks.

9. In a device of the character described, in combination with a relatively movable punch and die element, drawing mechanism movable with said punch in one direction, means for restraining said drawing mechanism from moving with said punch in the other direction, said means including a plurality of restraining pawls and stationary racks, and means for simultaneously withdrawing all of said restraining pawls from said racks, said restraining means being symmetrically disposed with respect to a horizontal plane through the axis of said punch.

10. In a device of the character described, in combination with relatively movable punch and die elements, drawing mechanism movable with said punch in one direction, means for feeding said drawing mechanism including a plurality of feed racks and pawls, means for restraining movement of said drawing mechanism in the opposite direction including a plurality of restraining racks and pawls and means for simultaneously withdrawing all of said pawls from said racks, when said drawing mechanism approaches a limit of its movement with said punch.

11. In a device of the character described, in combination with relatively movable punch and die elements, drawing mechanism, means for moving said drawing mechanism with said punch in one direction including a plurality of feed pawls, means for preventing the movement of said drawing mechanism with said punch in the opposite direction including a plurality of restraining pawls, and means operated by the movement of said drawing mechanism as it approaches the limit of its movement for withdrawing all of said pawls from operative position.

12. In a machine for drawing tubes, in combination with relatively reciprocable punch and die elements for pushing a tube through said die, drawing mechanism adapted to operatively engage the advancing end of the tube, means for intermittently moving said drawing mechanism to pull said tube through said die at the same time as it is pushed by said punch including a plurality of feed pawls, and means operated by the movement of said drawing mechanism for automatically withdrawing all of said feed pawls from operative position.

13. In a machine for drawing tubes, in combination with relatively reciprocable punch and die elements for pushing a tube through said die, drawing mechanism adapted to operatively engage the advancing end of the tube and movable with said punch in one direction to pull said tube through said die at the same time as it is pushed by said punch, means for preventing movement of said drawing mechanism with said punch in the opposite direction including a plurality of restraining pawls, and means operated by the movement of said drawing mechanism for automatically withdrawing all of said restraining pawls from operative position.

14. In a machine for drawing tubes, in combination with relatively reciprocable punch and die elements for pushing a tube through said die, drawing mechanism adapted to operatively engage the advancing end of the tube and movable step by step with said punch to pull said tube through said die at the same time as it is pushed by said punch, normally distended gripping means carried by said drawing mechanism to which the advancing end of the tube is adapted to be secured when the drawing mechanism is moved into position to commence the drawing operation, and means automatically actuated by the movement of said drawing mechanism for closing said gripping means.

15. In a machine for drawing tubes, in combination with relatively reciprocable punch and die elements for pushing a tube through said die, drawing mechanism adapted to operatively engage the advancing end of the tube and movable step by step with said punch to pull said tube through said die at the same time as it is pushed by said punch, a tail piece mounted between the end of said punch and the advancing end of said tube and capable of relative movement with respect to the punch, and means on the drawing mechanism for automatically gripping the tail piece when moved into adjacency therewith.

16. In a machine for drawing tubes, in combination with relatively reciprocable punch and die elements for pushing a tube through said die, drawing mechanism adapted to pull said tube through said die at the same time as it is pushed by said punch, a tail piece mounted between the end of said punch and the advancing end of said tube and capable of relative movement with respect to said punch, and means on said drawing mechanism for automatically gripping the tail piece and clamping the tube to said tail piece when moved into adjacency thereto.

17. In a device of the character described, in combination with relatively movable punch and die elements, a tail piece mountable on said punch, drawing mechanism including means for gripping said tail piece, resilient means carried by said drawing mechanism and placed under compression by contact with said tail piece when said mechanism is engaged therewith, and means for releasing said compression at the close of the drawing operation whereby said resilient means ejects said tail piece from said drawing mechanism.

18. In a device of the character described, in combination with relatively movable punch and die elements, drawing mechanism, a tail piece mountable on said punch and movable with respect thereto, means on said drawing mechanism for gripping said tail piece and clamping the end of the tube thereto, and means acting automatically to eject said tail piece from said gripping means at the close of the drawing operation.

19. In a device of the character described, in combination with relatively movable punch and die elements, drawing mechanism, means for moving said drawing mechanism including feeding pawls, a tail piece mountable on said punch, means on said drawing mechanism for gripping said tail piece, and means for simultaneously disconnecting said feeding pawls and ejecting said tail piece.

20. In a machine for drawing tubes, in combination with relatively movable punch and die elements for pushing a tube through said die, drawing mechanism adapted to pull said tube through said die at the same time as it is pushed by said punch, means for moving said drawing mechanism during alternate strokes of said reciprocable punch including feed racks and pawls, a tail piece mounted between the end of said punch and the advancing end of said tube and capable of relative movement with respect to said punch, means on said drawing mechanism for gripping said tail piece, and means whereby said last named means is operated simultaneously with the engagement of said feed pawls with their racks.

21. In a device of the character described, in combination with relatively movable punch and die elements, drawing mechanism, means for moving said drawing mechanism including feed pawls, means for preventing movement of said drawing mechanism with said punch in one direction including restraining pawls, a tail piece mountable on said punch, means on said drawing mechanism for gripping said tail piece, and means for operating said gripping mechanism and said pawls simultaneously.

22. In a machine for drawing tubes, in combination with relatively movable punch and die elements for pushing a tube through said die, drawing mechanism adapted to pull said tube through said die at the same time as it is pushed by said punch, a tail piece mounted between the end of said punch and the advancing end of said tube and movable with the end of said tube relatively to said punch, and a chuck on said drawing mechanism for automatically gripping said tail piece when said mechanism is moved into position to commence the drawing operation.

23. In a machine for drawing tubes, in combination with relatively reciprocable punch and die elements for pushing a tube through said die, drawing mechanism adapted to pull said tube through said die at the same time as it is pushed by said punch, means for feeding said drawing mechanism step by step with the alternate strokes of said reciprocable punch, a tail piece mounted between the end of said punch and the advancing end of said tube and remaining with the end of said tube during relative movements of said punch, means on said drawing mechanism for automatically gripping said tail piece, and means for automatically operating said feeding mechanism and said gripping mechanism simultaneously.

24. In a machine for drawing tubes, in combination with relatively reciprocable punch and die elements for pushing a tube through said die, drawing mechanism adapted to pull said tube through said die at the same time as it is pushed by said punch, means for feeding said drawing mechanism away from said die step by step in synchronism with alternate strokes of said reciprocable punch, a tail piece mounted between the end of said punch and the advancing end of said tube and remaining with the end of said tube during relative movements of said punch, means on said drawing mechanism for gripping said tail piece, and means for simultaneously rendering both said feeding mechanism and gripping mechanism inoperative.

25. In a machine for drawing tubes, in combination with relatively reciprocable punch and die elements for pushing a tube through said die, drawing mechanism adapted to pull said tube through said die at the same time as it is pushed by said punch, means for feeding said drawing mechanism away from said die step by step in synchronism with alternate strokes of said reciprocable punch, a tail piece mounted between the end of said punch and the advancing end of said tube and remaining with the end of said tube during relative movements of said punch, means on said drawing mechanism for gripping said tail piece, and means for simultaneously rendering said gripping mechanism and said feeding mechanism operative.

26. In a machine for drawing tubes, in combination with relatively movable punch and die elements for pushing a tube through said die, drawing mechanism adapted to pull said tube through said die at the same time as it is pushed by said punch, a tail piece mounted between the end of said punch and the advancing end of said tube and fixed to said tube end as respects relative movements of said punch, and means on said drawing mechanism for automatically gripping said tail piece at one extremity of the movement of said drawing mechanism.

27. In a machine for drawing tubes, in combination with relatively reciprocable punch and die elements for pushing the tube through said die, drawing mechanism adapted to pull said tube through said die at the same time as it is pushed by said punch, said mechanism moving away from said die intermittently in synchronism with alternate strokes of said punch, a tail piece mounted between the end of said punch and the advancing end of said tube and fixed to said tube end as respects relative movements of said punch, means on said drawing mechanism for automatically gripping said tail piece at one extremity of the movement of said drawing mechanism, and means for automatically ejecting said tail piece from said drawing mechanism at the opposite end of its movement.

28. In a device for drawing tubes, in combination with relatively movable punch and die elements for pushing a tube through said die, drawing mechanism adapted to pull said tube through said die at the same time as it is pushed by said punch, a tail piece mounted between the end of said punch and the advancing end of said tube and fixed to said tube end as respects relative movements of said punch, jaws on said drawing mechanism for gripping said tail piece, and means for automatically operating said jaws to grip said tail piece.

29. In a machine for drawing tubes, in combination with relatively reciprocable punch and die elements for pushing a tube through said die, drawing mechanism adapted to engage the advancing end of said tube and intermittently movable step by step in synchronism with alternate strokes of said reciprocable punch to pull said tube through said die at the same time as it is pushed by said punch, a tail piece mounted between the end of said punch and the advancing end of said tube and fixed to said tube end as respects relative movements of said punch, jaws on said drawing mechanism for gripping said tail piece, and means for automatically operating said jaws to release said tail piece.

30. In a machine for drawing tubes, in combination with relatively reciprocable punch and die elements for pushing a tube through said die, drawing mechanism adapted to engage the advancing end of said tube and intermittently movable step by step in synchronism with alternate strokes of said reciprocable punch to pull said tube through said die at the same time as it is pushed by said punch, a tail piece mounted between the end of said punch and the advancing end of said tube and fixed to said tube end as respects relative movements of said punch, jaws on said drawing mechanism for gripping said tail piece, feeding mechanism mounted on said drawing mechanism, and a common means for simultaneously operating both said jaws and said feeding mechanism.

31. In a machine for drawing tubes, in combination with relatively reciprocable punch and die elements, for pushing a tube through said die, drawing mechanism adapted to engage the advancing end of said tube and intermittently movable step by step in synchronism with alternate strokes of said reciprocable punch to pull said tube through said die at the same time as it is pushed by said punch, a tail piece mounted between the end of said punch and the advancing end of said tube and fixed to said tube end as respects relative movements of said punch, means on said drawing mechanism for gripping said tail piece, feeding mechanism mounted on said drawing mechanism, a common means for operating said gripping and feeding means, and means for automatically operating said last named means.

32. In a machine for drawing tubes, in combination with relatively reciprocable punch and die elements for pushing a tube through said die, drawing mechanism adapted to engage the advancing end of said tube and intermittently movable step by step in synchronism with alternate strokes of said reciprocable punch to pull said tube through said die at the same time as it is pushed by said punch, a tail piece mounted between the end of said punch and the advancing end of said tube and fixed to said tube end as respects relative movements of said punch, means on said drawing mechanism for gripping said tail piece, feeding mechanism mounted on said drawing mechanism, a common means for operating said gripping and feeding means, and means for automatically operating said last named means to release said gripping means and disconnect said feeding mechanism as said drawing mechanism approaches the end of the stroke.

33. In a device of the character described, in combination with relatively movable punch and die elements, drawing mechanism movable with said punch in one direction and independently of said punch in the other direction, means for moving said drawing mechanism in the last-named direction at a higher rate of speed than said mechanism is moved with said punch, and means for cushioning said last-named means as the drawing mechanism approaches the end of its stroke, said last named means including a fluid-operated cushioning device and a controlling valve therefor operated by said drawing mechanism.

34. In a device of the character described, in combination with relatively movable punch and die elements, drawing mechanism movable with said punch in one direction and independently of said punch in the other direction, means for moving said drawing mechanism in the last-named direction at an increased speed, and means actuated by said drawing mechanism for cushioning said last named means as it approaches the end of its stroke whereby said drawing mechanism is brought to rest without shock, said last named means including a fluid-operated cushioning device, a controlling valve therefor and means on said drawing mechanism for operating said valve at a predetermined point in the stroke of said mechanism.

35. In a device of the character described, in combination with relatively movable punch and die elements, drawing mechanism movable with said punch, means for moving said die into and out of operative position comprising reversible gearing, and means for moving said punch into and out of alignment with said die, said last named means being operable by said movement of the die.

36. In a device of the character described, in combination with relatively movable punch and die elements, means for moving said die into and out of operative position, means whereby said punch may be moved into and out of alignment with said die, and means operated by said die-moving means for controlling the position of said punch.

37. In a device of the character described, in combination with relatively movable punch and die elements, means movable into operative relation with said punch for guiding the same in its operative position, means for moving the die into and out of operative relation with the punch, and means controlled by the movement of said last named means for controlling the position of said guiding means.

38. In a device of the character described, in combination with relatively movable punch and die elements, means for moving said punch into and out of alignment with said die, means for guiding said punch movable into and out of operative relation therewith, means for moving said die into and out of operative relation with said punch, and means controlled by the operation of said last named means for controlling in sequence the position of said punch and guiding means.

39. In a device of the character described, in combination with relatively movable punch and die elements, means for moving said punch into and out of alignment with said die, means for reciprocating said die, and means operated by said die-reciprocating means for actuating said punch moving means.

40. In a device of the character described, in combination with relatively movable punch and die elements, means movable into and out of cooperative relation with said punch for guiding the same, means for reciprocating said die, and means operated by said die-reciprocating means, for controlling the position of said guiding means.

41. In a device of the character described, in combination with relatively movable punch and die elements, means for moving said punch into and out of alignment with said die, means movable into operative relation with said punch for guiding the same, means for reciprocating said die, and means actuated by said die-reciprocating means for actuating said punch-moving and guiding means in sequence.

42. In a machine for drawing tubes of the type employing relatively movable punch and die elements, a punch adapted to be supplied with a lubricating medium for reducing the frictional opposition to movement of said punch into cooperative engagement with succeeding lengths of the tube to be drawn comprising a punch head of substantially the same diameter as the interior of the tube to be drawn, a punch rod of substantially smaller diameter than the interior of said tube to provide a passage between said rod and tube, means for detachably securing said head to said rod, means for imparting reciprocating movement to said punch with and relatively to said tube, a coupling connecting said last named means to said rod, a longitudinal passageway extending substantially the length of said rod, a radial passageway connecting said longitudinal passageway with the space between the outer surface of said rod and the interior of said tube, and means associated with said coupling for supplying a lubricating medium to said longitudinal passageway.

43. In a tube drawing machine, the combination of a die, a reciprocable punch for pushing a tube through said die step by step, drawing mechanism movable step by step with alternate strokes of said punch for pulling the tube through the die at the same time at is it pushed by said punch, said punch being recessed at its forward end, and a tail piece mounted within said recess between the end of said punch and the flanged advancing end of said tube and attachable to said drawing mechanism for movement therewith independently of the movement of said punch whereby said tail piece is adapted to cooperate with said flanged tube and transmit thereto the pulling force of said drawing mechanism.

44. In a tube drawing machine, the combination of a die, a reciprocable punch for pushing a tube through said die step by step, drawing mechanism movable step by step with alternate strokes of said punch for pulling the tube through the die at the same time as it is pushed by said punch, said punch being recessed at its forward end, a tail piece mounted within said recess between the end of said punch and the flanged advancing end of said tube and attachable to said drawing mechanism for movement therewith independently of the movement of said punch whereby said tail piece is adapted to cooperate with said flanged tube and transmit thereto the drawing force of said drawing mechanism, said pulling mechanism including means for clamping the flanged end of the tube to said tail piece.

45. In a machine of the character described for drawing a tube, including a die element, a reciprocating punch element and an intermittently movable tail block movable with said punch in one direction to aid the passage of the tube through the die by exerting a drawing force thereon, means for moving said punch and tail block comprising a ram to which said punch is connected, a pair of reciprocating feed racks disposed symmetrically with respect to the axis of the tube being drawn and pawls on said tail block cooperating with said feed racks.

46. In a machine of the character described for drawing a tube, including a die element, a reciprocating punch element and an intermittently movable tail block movable with said punch in one direction to aid the passage of the tube through the die by exerting a drawing force thereon, means for moving said punch and tail block comprising a ram to which said punch is connected, a pair of reciprocating feed racks disposed symmetrically with respect to the axis of the tube being drawn, and pawls on said tail block cooperating with said feed racks, said pawls being disposed symmetrically with respect to a plane common to the axis of the tube and the axes of said feed racks.

47. In a machine of the character described for drawing a tube, including a die element, a reciprocating punch element and an intermittently movable tail block which is alternately stationary with respect to the movable punch and movable with said punch in one direction to aid the passage of the tube through the die by exerting a drawing force thereon, means for connecting said tail block to the tube comprising a plurality of normally distended gripping jaws carried by said tail block, means for positively forcing said jaws toward gripping position, and means for automatically actuating said last named means upon initial movement of said tail block with said punch in the direction of drawing movement.

48. In a machine of the character described for drawing a tube, including a die element, a reciprocating punch element and an intermittently movable tail block which is alternately stationary with respect to the movable punch and movable with said punch in one direction to aid the passage of the tube through the die by exerting a drawing force thereon, means for connecting and disconnecting said tail block to and from the end of the tube comprising a plurality of gripping jaws carried by said tail block, means movable in one direction to close said jaws and in the opposite direction to release the same, a piston operatively connected to said last named means, means for subjecting said piston to pressure on one side thereof when said tail block is moved into engagement with the end of the tube at the beginning of the drawing operation, and means for subjecting said piston to pressure on the other side thereof when said tail block approaches the end of its drawing movement.

49. In a machine of the character described for drawing a tube, including a die element, a reciprocating punch element and an intermittently movable tail block movable with said punch in one direction to aid the passage of the tube through the die by exerting a drawing force thereon, means for connecting the tail block to the end of the tube including a plurality of normally distended gripping jaws and a member movable to positively force said jaws toward gripping position, means for feeding said tail block with the punch comprising reciprocating feed racks and pawls on said tail block, and means actuated by the movement of said member for automatically connecting said pawls and feed racks simultaneously with the closing of said gripping jaws.

50. In a machine of the character described, including a die element, a reciprocating punch element and an intermittently movable tail block movable with said punch in one direction to aid the passage of the tube through the die by exerting a drawing force thereon, means for connecting said tail block to the end of the tube, means for feeding said tail block with said punch comprising reciprocating feed racks and pawls on said tail block, means for disconnecting said pawls from said feed racks automatically at the end of the drawing operation, and means for automatically disconnecting said tube from said tail block simultaneously with the disconnection of said pawls from the feed racks.

51. In a machine of the character described, including a die element, a reciprocating punch element and an intermittently movable tail block movable with said punch in one direction to aid the passage of the tube through the die by exerting a drawing force thereon, means for moving said tail block in the opposite direction to a position for attachment with said tube including a movable carriage and speed multiplying means operatively connecting said carriage to said tail block whereby the latter is moved at an increased speed, and fluid-operated cushioning means including a valve mechanism engaged and actuated by said tail block for cushioning the movement of said carriage as said tail block approaches the position of attachment with said tube.

52. In a machine of the character described, including a die element, a reciprocating punch element and an intermittently movable tail block movable with said punch in one direction to aid the passage of the tube through the die by exerting a drawing force thereon, means for alternately feeding said tail block with said punch and restraining said tail block from movement with said punch comprising feed racks symmetrically arranged with respect to the axis of said tube, restraining racks symmetrically arranged with respect to the axis of said tube and pawls on said tail block for cooperating with the respective racks.

53. In a machine of the character described, including a die element, a reciprocating punch element and an intermittently movable tail block movable with said punch in one direction to aid the passage of the tube through the die by exerting a drawing force thereon, means for alternately feeding the tail block with said punch and restraining said tail block from movement with said punch comprising feed racks symmetrically arranged with respect to the axis of the tube being drawn, restraining racks symmetrically arranged with respect to the axis of the tube being drawn, and pawls on said tail block symmetrically arranged with respect to a horizontal plane through said axis.

54. In a machine of the character described, including a die element, a reciprocating punch element and an intermittently movable tail block movable with said punch in one direction to aid the passage of the tube through the die by exerting a drawing force thereon, means for alternately feeding said tail block with said punch and restraining the same from movement with said punch, comprising reciprocating feed racks, stationary restraining racks, a plurality of feed pawls, a plurality of restraining pawls, and common means for automatically and simultaneously operating all of said pawls when said tail block approaches either extremity of its movement comprising a piston, means adapted to be actuated by the movements of said piston for operating all of said pawls at the same time, and means controlled by the movement of said tail block for subjecting said piston to pressure on one side or the other dependent upon which extremity of its movement the tail block is approaching.

55. In a machine of the character described, including a die element and a reciprocating punch element, a ram for moving said punch, a pivotal connection between said ram and punch, a roller carried by said punch, a track on which said roller is adapted to run when said punch is moved, the plane of said track being parallel to the axis of said die during the drawing operation, and means for varying the inclination of said track for moving said punch and supporting it in inoperative position.

56. In a machine of the character described, including a die element and a reciprocating punch element, a ram for moving said punch, a pivotal connection between said punch and ram, means for pivoting said punch with respect to said ram to position said punch for receiving the tube, means for moving the die into operative relation with said punch, and means operated by said last named means for controlling the position of said punch.

57. In a machine of the character described, including a die element and a reciprocating punch element, a ram for moving said punch, means for guiding said punch movable into and out of operative relation therewith, means for moving said die into operative relation with said punch, and means controlled by said last named means for actuating said punch guiding means.

58. In a machine for drawing tubes of the type embodying relatively movable punch and die elements, a block, a die removably mounted on said block, means for guiding said punch with respect to said die, and a member cooperating with said last named means and inclined to the axis of said die for moving said last named means toward and from the axis of said die.

59. In a machine for drawing tubes of the type having relatively movable punch and die elements, a block, a die removably mounted on said block, and adjustable means carried by said block for guiding said punch with respect to said die, said last named means comprising a bifurcated block, a screw inclined to the axis of said punch, and threaded means carried by said bifurcated block and engaging said screw.

60. In a machine of the character described for drawing a tube, including a die element, a reciprocating punch element for pushing a tube through said die element step by step and an intermittently movable tail block movable with said punch in one direction to aid the passage of the tube through the die by exerting a pulling force thereon, a ram for moving said punch, and means for moving said tail block with said punch in one direction comprising reciprocating feed racks also operated by said ram and disposed in the horizontal plane of the axis of said punch, and pawls on said tail block adapted to engage said racks.

61. In a machine for drawing tubes, in combination with relatively reciprocable punch and die elements, means for relatively reciprocating said punch and die elements, intermittently movable drawing mechanism adapted to operatively engage the advancing end of the tube and exert a drawing force thereon to assist the passage of said tube between said punch and die elements, and means for feeding said drawing mechanism, said means including a plurality of rack bars, pawls cooperating with said rack bars, means including a fluid-operated piston for simultaneously disengaging said pawls and rack bars, and a valve controlling the admission of fluid to said piston and operated by said drawing mechanism as it approaches one extremity of its movement.

62. In a machine for drawing tubes, in combination with relatively reciprocable punch and die elements, means for relatively reciprocating said punch and die elements, intermittently movable drawing mechanism adapted to operatively engage the advancing end of the tube and exert a drawing force thereon to assist the passage of said tube between said punch and die elements, and means for feeding said drawing mechanism, said means including a plurality of rack bars, pawls cooperating with said bars, means including a fluid-operated piston for simultaneously engaging with said pawls and rack bars, and a valve controlling the admission of fluid to said piston and operated by said drawing mechanism at the beginning of the drawing operation.

63. In a machine for drawing tubes, in combination with relatively reciprocable punch and die elements, means for relatively reciprocating said punch and die elements, intermittently movable drawing mechanism adapted to operatively engage the advancing end of the tube and exert a drawing force thereon to assist the passage of said tube between said punch and die elements, feeding means for operating said drawing mechanism, said drawing mechanism including means for gripping the end of a tube, a fluid-operated piston operatively connected with said gripping means and said feeding means, a valve for admitting fluid to said piston, and means on said drawing mechanism for operating said valve and releasing said gripping means and said feeding means at one extremity of the stroke of said drawing mechanism.

64. In a machine for drawing tubes, in combination with relatively reciprocable punch and die elements, means for relatively reciprocating said punch and die elements, intermittently movable drawing mechanism adapted to operatively engage the advancing end of the tube and exert a drawing force thereon to assist passage of said tube between said punch and die elements, feeding means for operating said drawing mechanism, said drawing mechanism including means for gripping the end of a tube, a fluid-operated piston operatively connected with said gripping means and said feeding means, a valve for admitting fluid to said piston, and means on said drawing mechanism for operating said valve and actuating said gripping mechanism and said feeding means at the beginning of the stroke of said drawing mechanism.

65. In a machine for drawing tubes, relatively movable punch and die elements, a fluid-operated piston for moving said punch into and out of alignment with said die, means for moving said die toward and away from said punch, valve mechanism for admitting fluid to said piston, and means moved by said die moving means for operating said valve mechanism.

66. In a machine for drawing tubes, in combination with relatively movable punch and die elements, means for guiding said die, a fluid-operated piston for moving said guiding means into and out of operative position, means for moving said die toward and away from said punch, valve mechanism for admitting fluid to said piston, and means operated by said die moving means for operating said valve mechanism.

JEAN V. GIESLER.